(12) United States Patent
Koo et al.

(10) Patent No.: US 11,989,543 B2
(45) Date of Patent: *May 21, 2024

(54) METHOD FOR INTEROPERATING BETWEEN BUNDLE DOWNLOAD PROCESS AND eSIM PROFILE DOWNLOAD PROCESS BY SSP TERMINAL

(71) Applicant: Samsung Electronics Co., Ltd., Suwon-si (KR)

(72) Inventors: Jonghoe Koo, Suwon-si (KR); Duckey Lee, Suwon-si (KR); Kangjin Yoon, Suwon-si (KR); Hyewon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/892,338

(22) Filed: Aug. 22, 2022

(65) Prior Publication Data

US 2022/0398080 A1 Dec. 15, 2022

Related U.S. Application Data

(63) Continuation of application No. 16/799,145, filed on Feb. 24, 2020, now Pat. No. 11,422,786.

(30) Foreign Application Priority Data

Feb. 22, 2019 (KR) .................. 10-2019-0021260
Aug. 30, 2019 (KR) .................. 10-2019-0107495

(51) Int. Cl.
*G06F 8/61* (2018.01)
*H04W 8/22* (2009.01)

(52) U.S. Cl.
CPC ............... *G06F 8/61* (2013.01); *H04W 8/22* (2013.01)

(58) Field of Classification Search
CPC .................... G06F 8/65; H04W 8/22
See application file for complete search history.

(56) References Cited

U.S. PATENT DOCUMENTS 8,996,002 B2 3/2015 Rodgers et al.
10,021,558 B2 7/2018 Lalwaney
(Continued)

FOREIGN PATENT DOCUMENTS

CN 107005837 A 8/2017
CN 107580790 A 1/2018
(Continued)

OTHER PUBLICATIONS

Torsten J. Gerpott et al., "Embedded Subscriber Identity Module eSIM", [Online], pp. 293-296, [Retrieved from Internet on Dec. 29, 2023], <file:///C:/Users/zchowdhury/Downloads/s12599-017-0474-4.pdf> (Year: 2017)*

(Continued)

*Primary Examiner* — Ziaul A Chowdhury
(74) *Attorney, Agent, or Firm* — Jefferson IP Law, LLP

(57) ABSTRACT

A communication method and a system for converging a 5$^{th}$-Generation (5G) communication system for supporting higher data rates beyond a 4$^{th}$-Generation (4G) system with a technology for Internet of Things (IoT) are provided. The communication method and system includes intelligent services based on the 5G communication technology and the IoT-related technology, such as smart home, smart building, smart city, smart car, connected car, health care, digital education, smart retail, security and safety services.

16 Claims, 22 Drawing Sheets

(56) References Cited

U.S. PATENT DOCUMENTS

| | | | |
|---|---|---|---|
| 10,244,384 | B2 | 3/2019 | Park et al. |
| 10,368,240 | B2 | 7/2019 | Park et al. |
| 10,439,823 | B2 | 10/2019 | Park et al. |
| 10,666,660 | B2 | 5/2020 | Park et al. |
| 2011/0145382 | A1 | 6/2011 | Lee et al. |
| 2017/0064552 | A1 | 3/2017 | Park et al. |
| 2017/0142121 | A1 | 5/2017 | Lee et al. |
| 2017/0222991 | A1 | 8/2017 | Yang |
| 2017/0244837 | A1* | 8/2017 | Kim .................. H04M 1/72409 |
| 2017/0317990 | A1 | 11/2017 | Kim et al. |
| 2018/0302781 | A1* | 10/2018 | Lee ..................... H04W 12/069 |
| 2019/0020997 | A1 | 1/2019 | Park et al. |
| 2019/0265901 | A1* | 8/2019 | Raboisson ................ G06F 8/65 |
| 2019/0313246 | A1 | 10/2019 | Nix |
| 2020/0092095 | A1 | 3/2020 | Yang et al. |
| 2020/0097279 | A1 | 3/2020 | Mukhopadhayay et al. |
| 2020/0112854 | A1* | 4/2020 | Namiranian ...... H04M 1/72445 |
| 2020/0252791 | A1* | 8/2020 | Hamblet ............... H04W 12/50 |

FOREIGN PATENT DOCUMENTS

| | | |
|---|---|---|
| CN | 108886683 A | 11/2018 |
| KR | 10-2014-0114895 A | 9/2014 |
| KR | 10-2016-0122061 A | 10/2016 |
| KR | 10-2017-0077489 A | 7/2017 |
| KR | 10-2017-0124360 A | 11/2017 |
| KR | 10-2017-0140809 A | 12/2017 |
| KR | 10-2018-0004119 A | 1/2018 |
| KR | 10-2018-0037220 A | 4/2018 |
| WO | 2020/171672 A1 | 8/2020 |

OTHER PUBLICATIONS

International Search Report dated Jun. 9, 2020, issued in International Application No. PCT/KR2020/002626.
Klaus Vedder, 'Smart Secure Platform', ETSI Security Week 2018, Jun. 13, 2018 pp. 6-7.
MSG MCP, 'Approved minutes 12th meeting ad hoc multistakeholder group on Mobile Contactless SEPA Cards Interoperability Implementation Guidelines (MCP IIGs)', MSG MCP 008-2018, V1.0, May 23, 2018 section 6.
Terms of Reference—Specialist Task Force STF CG (TC SCP / WG TEC) "Smart Secure Platform", Tdoc SCP(17) 000188, ETSI TC SCP Meeting #81, Apr. 4, 2018 pp. 1-10.
GSM Association, LSin GSMA on Smart Secure Platform Ecosystem and Interoperability Principles, Jan. 24, 2018, pp. 1-9, XP014309262.
Secretary, Report SCP REQ#69, ETSI Draft; SCPREQ(18)000097R1, ETSI Technical Committee Smart Card Platform (TC SCP), vol. WG SCP REQ SCP-REQ, Sep. 20, 2018, pp. 1-15, Paris, France, XP014327002.
European Search Report dated Feb. 28, 2022, issued in European Application No. 20758858.3.
Yanhua Zhang et al. "Green Machine-to-Machine Communications with Mobile Edge Computing and Wireless Network rtualization" [Online], pp. 148-154, [Retrieved from Internet on Apr. 8, 2022], <https://ieeexplore.ieee.org/stamp/stamp.jsp?arnumber=8360866> (Year: 2018).
K. M. Muzahidul Islam et al., "eSIM With Secured Context Switching", [Online], pp. 1-33, [Retrieved from Internet on Apr. 8, 2022], <https://link.springer.com/chapter/10.1007/978-981-15-1384-8_8> (Year: 2019).
M. Capitani et al., "Experimental Demonstration of a 5G Network Slice Deployment through the 5G-Transformer Architecture", [Online], pp. 1-3, [Retrieved from Internet on May 22, 2021], <https://ieeexplore.ieee.org/stamp/stamp.jsp?arnumber=8535163> (Year: 2018).
Evangelos Markakis et al., "Acceleration at the Edge for Supporting SM Es Security: The FORTI KA Paradigm", [Online], pp. 41-47, [Retrieved from Internet on May 22, 2021], <https://ieeexplore.ieee.org/stamp/stamp.jsp?arnumber=864711 O> (Year: 2019).
Indian Office Action dated Jul. 25, 2023, issued in Indian Application No. 202137037762.
Chinese Office Action dated Feb. 28, 2024, issued in Chinese Application No. 202080015823.5.
European Office Action dated Dec. 7, 2023, issued in European Application No. 20758858.3.
Korean Notice of Allowance dated Jan. 19, 2024, issued in Korean Application No. 10-2019-0107495.

* cited by examiner

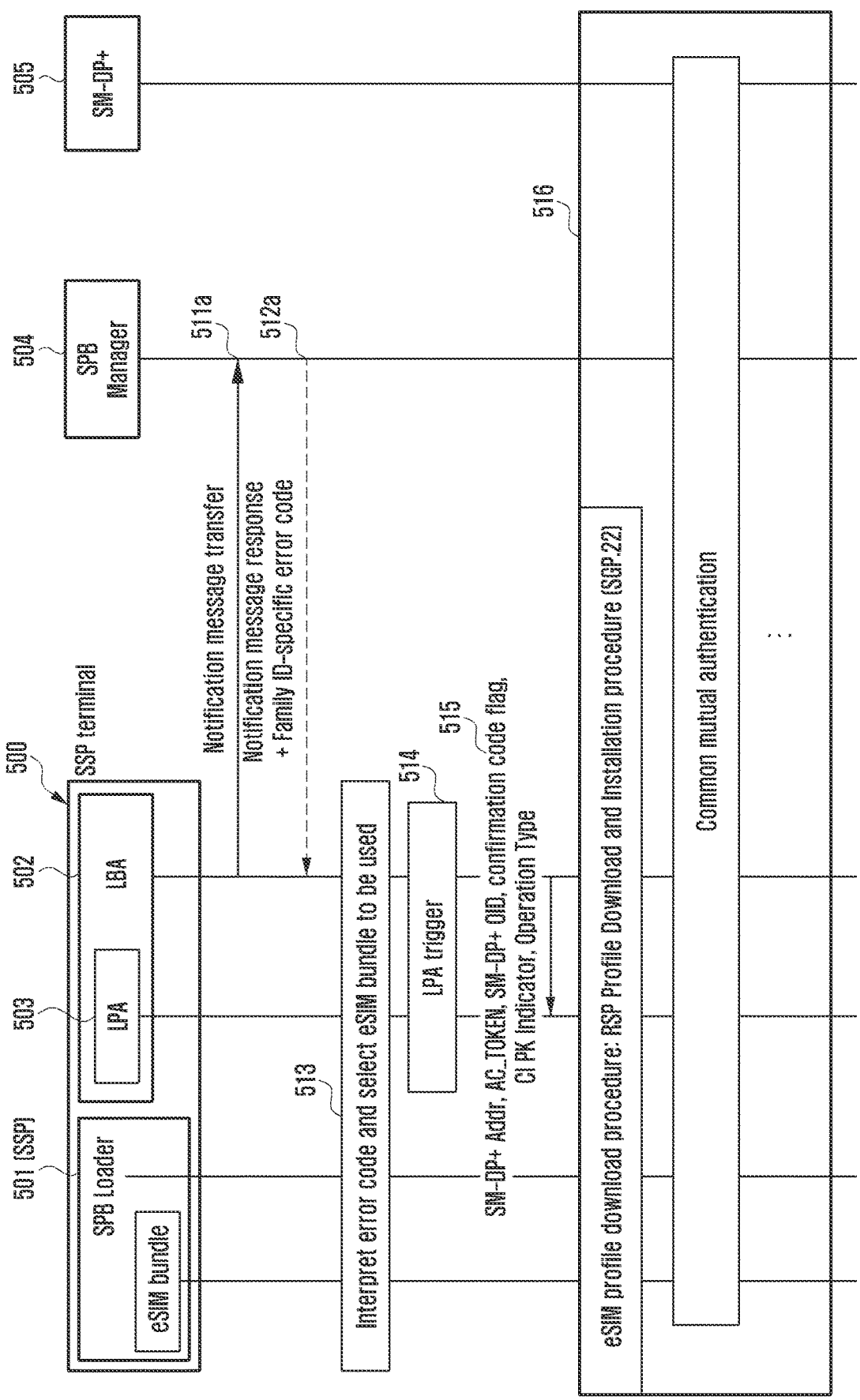

METHOD FOR INTEROPERATING BETWEEN BUNDLE DOWNLOAD PROCESS AND eSIM PROFILE DOWNLOAD PROCESS BY SSP TERMINAL

CROSS-REFERENCE TO RELATED APPLICATION(S)

This application is a continuation application of prior application Ser. No. 16/799,145, filed on Feb. 24, 2020, which is based on and claims priority under 35 U.S.C. § 119(a) of a Korean patent application number 10-2019-0021260, filed on Feb. 22, 2019, in the Korean Intellectual Property Office, and of a Korean patent application number 10-2019-0107495, filed on Aug. 30, 2019, in the Korean Intellectual Property Office, the disclosure of each of which is incorporated by reference herein in its entirety.

BACKGROUND

1. Field

The disclosure relates to a method and a device for installing an embedded subscriber identity module (eSIM) profile when a bundle download procedure of a smart secure platform (SSP) terminal fails.

2. Description of the Related Art

To meet the demand for wireless data traffic having increased since deployment of $4^{th}$-Generation (4G) communication systems, efforts have been made to develop an improved $5^{th}$-Generation (5G) or pre-5G communication system. Therefore, the 5G or pre-5G communication system is also called a 'Beyond 4G Network' or a 'Post long term evolution (LTE) System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid frequency shift keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method in which an SSP terminal may perform switching to an eSIM profile download procedure through a disclosed embodiment, when in the SSP terminal, a server may not process an SSP bundle download procedure or when the SSP terminal fails to install a bundle.

Another aspect of the disclosure is to provide a method which can be applied as a method in which, according to the disclosure, the SSP terminal selectively performs another operation which is defined in a corresponding family industry according to family of a requested bundle when the SSP terminal tries to download a bundle or fails to install a bundle.

Additional aspects will be set forth in part in the description which follows and, in part, will be apparent from the description, or may be learned by practice of the presented embodiments.

In accordance with an aspect of the disclosure, a method performed by a server in a wireless communication system is provided. The method includes receiving, from a terminal, a first message requesting a download of a bundle, determining whether the bundle can be installed, based on the first message, and transmitting, to the terminal, a second message including a family identifier-specific error code in case that the bundle cannot be installed.

In an embodiment, wherein the family identifier-specific error code includes information on a profile download.

In an embodiment, wherein a bundle previously installed in the terminal is selected by the terminal, based on the family identifier-specific error code included in the second message.

In an embodiment, wherein a profile with respect to the bundle previously installed in the terminal is downloaded by the terminal, based on the selected bundle.

In an embodiment, wherein the first message includes at least one of smart secure platform (SSP) information or terminal information.

In accordance with another aspect of the disclosure, a method performed by a terminal in a wireless communication system is provided. The method includes transmitting, to a server, a first message requesting a bundle download, and receiving, from the server, a second message including a family identifier-specific error code in case that a bundle cannot be installed, wherein whether the bundle can be installed is determined by the server, based on the first message.

In accordance with another aspect of the disclosure, a server is provided. The server includes a transceiver configured to transmit or receive at least one signal, and a controller/processor coupled to the transceiver, wherein the controller/processor is configured to receive, from a terminal, a first message requesting a download of a bundle, determine whether the bundle can be installed, based on the first message, and transmit, to the terminal, a second message including a family identifier-specific error code in case that the bundle cannot be installed.

In accordance with another aspect of the disclosure, a terminal is provided. The terminal includes a transceiver configured to transmit or receive at least one signal, and a controller/processor coupled to the transceiver, wherein the controller/processor is configured to transmit, to a server, a first message requesting a bundle download, and receive, from the server, a second message including a family identifier-specific error code in case that a bundle cannot be installed, wherein whether the bundle can be installed is determined by the server, based on the first message.

In addition, an embodiment may provide a method including transferring, to a server of an secondary platform bundle (SPB) manager, SSP information and terminal information when an SSP terminal requests a bundle download, determining, by the SPB manager, compatibility of a bundle, based on the terminal information and the SSP information provided by the SSP terminal which has requested a bundle download, determining, by the SPB manager, whether the switching to eSIM profile download is possible when the SSP terminal fails to download a bundle because there is no bundle compatible with the SSP terminal having requested a bundle, determining, by the SPB manager, whether the SSP terminal can perform switching to eSIM profile download, generating, by the SPB manager, a family identifier-specific error code, transmitting, to the SSP terminal, the generated family identifier-specific error code together with an error message, and performing, by the SSP terminal, an eSIM profile download procedure by applying an eSIM bundle, local profile assistant (LPA), and information included in the family identifier-specific error code.

In accordance with another aspect of the disclosure, a method is provided. The method includes generating and transferring, by an SSP terminal, a notification message to an SPB manager when bundle installation fails, determining, by the SPB manager, whether switching to eSIM profile download is possible, determining, by the SPB manager, whether the SSP terminal can perform switching to eSIM profile download, generating, by the SPB manager, a family identifier-specific error code, transmitting, to the SSP terminal, the generated family identifier-specific error code as a response to the notification message, and performing, by the SSP terminal, an eSIM profile download procedure by applying an eSIM bundle, LPA, and information included in the family identifier-specific error code.

The technical subjects pursued in the disclosure may not be limited to the above-mentioned technical subjects, and other technical subjects which are not mentioned may be clearly understood, through the following descriptions, by those skilled in the technical field to which the disclosure belongs.

According to various embodiments, an SSP terminal can provide a service by downloading a telecom bundle from an SPB manager server or downloading a profile to an eSIM bundle of the SSP terminal even when the installation is impossible.

In addition, according to various embodiments, user's convenience can be increased by minimizing the user's intervention through the linkage on a protocol between procedures of SSP bundle download and profile download.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 5B is a diagram illustrating the next operation when LBA of an SSP terminal receives a family identifier-specific error code transferred from an SPB manager during the bundle download procedure according to an embodiment of the disclosure;

Throughout the drawings, like reference numerals will be understood to refer to like parts, components, and structures.

DETAILED DESCRIPTION

Figure 1:
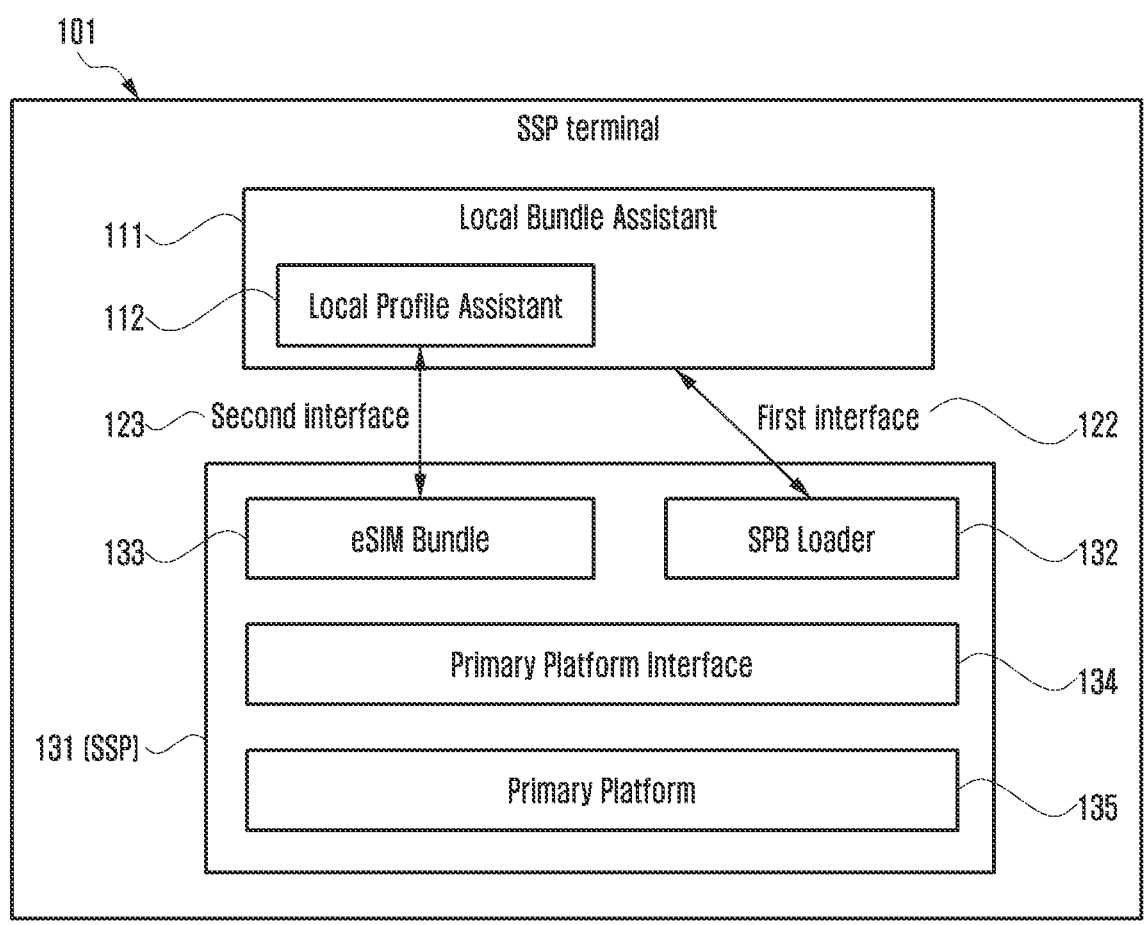
FIG. 1 is a diagram illustrating internal elements of an SSP terminal and an interface between the elements according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Here, it will be understood that each block of the flowchart illustrations, and combinations of blocks in the flowchart illustrations, can be implemented by computer program instructions. These computer program instructions can be loaded in a processor of a general purpose computer, special purpose computer, or other programmable data processing apparatus, such that the instructions, which execute via the processor of the computer or another programmable data processing apparatus, create means for implementing the functions specified in the flowchart block or blocks. These computer program instructions can also be stored in a computer usable or computer-readable memory that can direct a computer or other programmable data processing apparatus to function in a specific manner, such that the instructions stored in the computer usable or computer-readable memory produce an article of manufacture including instruction means that implement the function specified in the flowchart block or blocks. The computer program instructions can also be loaded onto a computer or other programmable data processing apparatus to cause a series of operations to be performed on the computer or other programmable data processing apparatus to produce a computer implemented process such that the instructions that execute on the computer or other programmable data processing apparatus provide operations for implementing the functions specified in the flowchart block or blocks.

In addition, each block of the flowchart illustrations can represent a module, segment, or portion of code, which includes one or more executable instructions for implementing the specified logical function(s). It should also be noted that in some alternative implementations, the functions noted in the blocks can occur out of the order. For example, two blocks shown in succession can in fact be executed substantially concurrently or the blocks can sometimes be executed in the reverse order, depending upon the functionality involved.

As used herein, the "unit" refers to a software element or a hardware element, such as a field programmable gate array (FPGA) or an application specific integrated circuit (ASIC), which performs a predetermined function. However, the "unit does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, "unit" or divided into a larger number of elements, "unit". Moreover, the elements and "units" may be implemented to reproduce one or more CPUs within a device or a security multimedia card.

Specific terms used in the description below are provided to help understanding of the disclosure, and the use of these specific terms can be modified in other forms without departing from the technical idea of the disclosure.

A secure element (SE) indicates a security module configured as a single chip which may store security information (for example, a mobile communication network access key, user identification information such as an identification card and a passport, credit card information, an encryption key, and the like), and may include and operate a control module (for example, a network access control module such as a USIM, an encryption module, a key generation module, and the like), which is loaded thereon and uses the stored security information. The SE may be applied to various electronic devices (for example, a smart phone, a tablet PC, a wearable device, a vehicle, an IoT device, and the like), and may provide a security service (for example, mobile communication network access, payment, user authentication, and the like) through security information and a control module.

The SE can be divided into a universal integrated circuit card (UICC), an embedded secure element (eSE), and a smart secure platform (SSP) which is an integrated form of the UICC and the eSE, and can be subdivided into a removable type, an embedded type, and an integrated type in which the SE is integrated into a specific element or a system on chip (SoC), depending on the form of connection or installation to an electronic device.

An UICC is a smart card which is inserted into a mobile communication terminal to be used and is called an UICC card. The UICC may include an access control module for accessing a mobile network operator's network. Examples of the access control module include a universal subscriber identity module (USIM), a subscriber identity module (SIM), an IP multimedia service identity module (ISIM), and the like. An UICC including a USIM may be commonly called a USIM card. Similarly, an UICC including a SIM module may be commonly called a SIM card. Meanwhile, a SIM module may be mounted when an UICC is manufactured or a user can download, to an UICC card, a SIM module of a mobile communication service which the user is to use at the time when the user wants to use that service. In addition, an UICC card may download and install a plurality of SIM modules, and select and use at least one SIM module there among. The UICC card may be fixed or may not be fixed to a terminal. The UICC fixed to a terminal for use is called an embedded UICC (eUICC), and in particular, the UICC embedded in a communication processor of a terminal, an application processor of a terminal, or a system-on-chip (SoC) having a single processor structure in which the two processors are integrated may be called an integrated UICC (iUICC). Normally, the eUICC and the iUICC are fixed to a terminal for use and may indicate an UICC card which may remotely download and select a SIM module. In the disclosure, an UICC card which may remotely download and select a SIM module is collectively referred to as an eUICC or an iUICC. That is, among UICC cards which may remotely download and select a SIM module, an UICC card which is fixed to or is not be fixed to a terminal is collectively referred to as an eUICC or an iUICC. In addition, an eUICC profile, an iUICC profile, or more simply, a profile is used as a common term indicating downloaded SIM module information.

An embedded secure element (eSE) indicates an embedded-type SE which is fixed to an electronic device to be used. The eSE is typically manufactured only for a manufacturer by the terminal manufacturer's request, and can be manufactured by including an operating system and a framework. The eSE remotely downloads and installs an applet type service control module and can be used for various security services such as an electronic wallet, ticketing, an electronic passport, and a digital key. In the disclosure, a single chip type SE, which is attached to an electronic device and may remotely download and install a service control module, is collectively referred to as an eSE.

A smart secure platform (SSP) can integrate functions of an UICC and an eSE on a single chip and may be simply called an SSP. The SSP can be divided into a removable SSP (rSSP), an embedded SSP (eSSP), and an integrated SSP (iSSP) embedded on an SoC. The SSP may be constituted by one primary platform (PP) and at least one secondary platform bundle (SPB) operating on the PP, the primary platform may include at least one of a hardware platform and a low level operating system (LLOS), and the secondary platform bundle may include at least one of a high-level operating system (HLOS) and an application operating on the HLOS. The secondary platform bundle is also called an SPB or a bundle. A bundle may access resources such as a central processing unit and a memory of a PP through a primary platform interface (PPI) provided by the PP, and operate on the PP therethrough. A bundle may allow a communication application such as a subscriber identification module (SIM), a universal SIM (USIM), and an IP multimedia SIM (ISIM) to be mounted therein, and may also allow various applications such as an electronic wallet, ticketing, an electronic passport, and a digital key to be mounted therein.

An SSP may be used for the UICC or the eSE, which are described above, according to a bundle remotely downloaded and installed, and be used for both the UICC and the eSE by installing a plurality of bundles on a single SSP and operating all of them. That is, when a bundle including a profile operates, the SSP may be used for the UICC for accessing a mobile network operator's network. Like the eUICC or the iUICC, the corresponding UICC bundle may operate by remotely downloading at least one profile thereinto and selecting the same. In addition, when a bundle including a service control module operates, the SSP may be used for the eSE, the service control module including an application which is mounted therein and can provide services such as an electronic wallet, ticketing, an electronic passport, and a digital key. Multiple service control modules may operate by being integrated with a single bundle so as to be installed, or each of the service control modules may operate by being installed in an independent bundle.

Hereinafter, terms used in the disclosure will be described in more detail.

In the disclosure, an SSP indicates a chip-type security module which can integrate functions of an UICC and an eSE on a single chip and be divided into a removable SSP (rSSP), an embedded SSP (eSSP), and an integrated SSP (iSSP) embedded on an SoC. The SSP may download a bundle from an external bundle management server (secondary platform bundle manager, SPB manager) and install the bundle, by using an over the air (OTA) technology.

In the disclosure, a method in which an SSP downloads and installs a bundle by using an OTA technology may be equally applied to a removable SSP (rSSP) capable of being inserted into or removed from a terminal, an embedded SSP (eSSP) installed in a terminal, and an integrated SSP (iSSP) embedded in an SoC installed in a terminal.

In the disclosure, the term for an UICC may be used interchangeably with the term for a SIM, and the term for an eUICC may be used interchangeably with the term for an eSIM.

In the disclosure, an SPB operates on a PP of an SSP by using a resource of the PP, for example, an UICC bundle may indicate a software package of an application, a file system, a value of an authentication key, which are stored in an existing UICC, and an operating system (HLOS) in which they operate. The SPB may be called a bundle.

A USIM profile may have the same meaning as a profile, or may indicate a software package of information included in a USIM application of the profile.

An operation of enabling a bundle by a terminal or an external server may indicate an operation of changing a state of the corresponding profile to be in an enabled state to configure such that a terminal receives a service (for example, a communication service via a mobile operator, a credit card payment service, a user authentication service, and the like) provided by the corresponding bundle. A bundle in an enabled state may be expressed as "an enabled bundle". The bundle in an enabled state may be stored in a storage space inside or outside an SSP while being in an encrypted state.

The enabled bundle may be changed to be in an active state, depending on bundle external input (for example, user input, push, a request of an application in a terminal, an authentication request of a mobile operator, a PP management message, and the like) or a bundle internal operation (for example, timer and polling). An active bundle may be loaded from a storage space inside or outside the SSP to an active memory inside the SSP, may process security information by using a security control device (secure CPU) inside the SSP, and may provide a terminal with a security service.

An operation of disabling a bundle by a terminal or an external server may indicate an operation of changing a state of the corresponding bundle to be in a disabled state to configure such that a terminal does not receive a service provided by the corresponding bundle. A profile in a disabled state may be expressed as "a disabled bundle". The bundle in an enabled state may be stored in a storage space inside or outside an SSP while being in an encrypted state.

In the disclosure, a bundle management server may include a function of: generating a bundle by a request of a service provider or other bundle management server; encrypting the generated bundle; generating a bundle remote management instruction; or encrypting the generated bundle remote management instruction. The bundle management server providing the function above may be expressed as at least one of a secondary platform bundle manage (SPB manager), a remote bundle manager (RBM), an image delivery server (IDS), subscription manager data preparation (SM-DP), subscription manager data preparation plus (SM-DP+), a manager bundle server, managing subscription manager data preparation plus (managing SM-DP+), a bundle encryption server, a bundle generation server, a bundle provisioner (BP), a bundle provider, and a bundle provisioning credentials holder (BPC holder).

The bundle management server may play a role of downloading, installing, or updating a bundle in an SSP, and managing setting of a key and a certificate for remotely managing a state of the bundle. The bundle management server providing the function above may be expressed as at least one of an SPB manager, an RBM, an IDS, subscription manager secure routing (SM-SR), subscription manager secure routing plus (SM-SR+), an off-card entity of eUICC profile manager, a profile management credentials holder (PMC holder), or an eUICC Manager (EM).

An opening relay server may be expressed as at least one of a SPB manager, a RBM, a secondary platform bundle discovery server (SPBDS), a bundle discovery server (BDS), a subscription manager discovery service (SM-DS), a discovery service (DS), a root inauguration relay server (root SM-DS), and an alternative inauguration relay server (alternative SM-DS). The inauguration relay server may receive an event register request (register event request) from one or more bundle management servers and inauguration relay servers. In addition, one or more inauguration relay servers may be complexly used, and in that case, a first inauguration relay server may receive an event register request from not only a bundle management server but also a second inauguration relay server. In the disclosure, the function of the inauguration relay server may be integrated with the bundle management server.

The term "a terminal" used in the disclosure may be referred to as a mobile station (MS), user equipment (UE), a user terminal (UT), a wireless terminal, an access terminal (AT), a terminal, a subscriber unit, a subscriber station (SS), a wireless device, a wireless communication device, a wireless transmit/receive unit (WTRU), a moving node, a mobile, or other terms. Various embodiments of a terminal may include a cellular phone, a smart phone having a wireless communication function, a personal digital assistant (PDA) having a wireless communication function, a wireless modem, a portable computer having a wireless communication function, a photographing device such as a digital camera having a wireless communication function, a gaming device having a wireless communication function, a home appliance for storing and reproducing music, which has a wireless communication function, an Internet home appliance capable of performing wireless Internet access and browsing, and portable units or terminals having integrated combinations of the functions thereof. Further, a terminal may include a machine-to-machine (M2M) terminal and a machine-type communication (MTC) terminal/device, but is not limited thereto. In the disclosure, a terminal may be referred to as an electronic device. An electronic device may include an SSP which is embedded therein and can download and install a bundle. When an SSP is not embedded in an electronic device, the SSP which is physically separated from the electronic device may be inserted into the electronic device to be connected to the electronic device. For example, the SSP may be inserted into the electronic device while being in the form of a card. The electronic device may include a terminal, and the terminal may be a terminal including the SSP capable of downloading and installing a bundle. The SSP may be embedded in the terminal, and when the SSP is separated from the terminal, the SSP may also be inserted into the terminal to be connected to the terminal.

The terminal or the electronic device may include local bundle assistant (LBA) or local bundle manager (LBM), which is software or an application installed in the terminal or the electronic device so as to control the SSP. The LBA application may download a bundle to the SSP or transfer, to the SSP, commands of activating, deactivating, and deleting the installed bundle.

The terminal or the electronic device may include local profile assistant (LPA) which is software or an application installed in the terminal or the electronic device so as to control an eUICC. The LPA may be implemented by being included in the LBA, or may exist as an application separate from the LBA in the terminal. The LPA may be software or an application capable of controlling an eSIM bundle of a terminal including an SSP embedded therein.

In the disclosure, a bundle identifier may be referred to as a factor matching with a bundle family identifier (SPB family identifier), a bundle matching ID, and an event identifier (event ID). The bundle identifier (SPB ID) may represent a unique identifier of each bundle. The bundle family identifier (SPB family identifier) may represent an identifier which identifies the type of bundles (for example, a telecom bundle for accessing a mobile network operator's network). A bundle delimiter may be used as a value capable of indexing bundles in a bundle management server. In the disclosure, an SSP identifier (SSP ID) may be a unique identifier of an SSP embedded in a terminal and may be referred to as sspID. In addition, as shown in an embodiment, when a terminal and an SSP chip are not separated from each other, the SSP identifier may be a terminal ID. Further, the SSP identifier may be referred to as a specific bundle identifier (SPB ID) in the SSP. More specifically, the SSP identifier may be referred to as a bundle identifier of a loader (secondary platform bundle loader, SPBL) or a management bundle which, in the SSP, installs other bundle and manages activation, deactivation, and deletion thereof. The SSP may have a plurality of SSP identifiers, and the plurality of SSP identifiers may be values induced by a unique single SSP identifier.

The loader (SPBL) may be referred to as a management bundle which, in the SSP, installs other bundle and manages activation, deactivation, and deletion thereof. LBA or a remote server of a terminal may install, activate, deactivate, or delete a specific bundle through a loader. In the disclosure, the loader may also be referred to as an SSP.

In the disclosure, an event may be a term collectively referred to as an instruction of bundle download, remote bundle management, or management/processing of another bundle or an SSP. The event may be referred to as a remote bundle provisioning operation, an RBP operation, or an event record, and each event may be referred to as data including at least one of an event identifier (event ID, eventID) corresponding thereto or a matching identifier (matching ID, matchingID), and each server identifier or an address (FQDN, IP address, or URL) of an inauguration relay server or a bundle management server in which the corresponding event is stored. The term for bundle download may be interchangeably used with the term for bundle installation. In addition, an event type may be used as a term indicating whether a specific event indicates bundle download, remote bundle management (for example, deletion, activation, deactivation, replacement, update, and the like), or an management/processing command of an SSP or other bundle, and may be referred to as an operation type (operationtype), an operation class (operationclass), an event request type, an event class, an event request class, and the like.

Local bundle management (LBM) may be referred to as bundle local management, local management, a local management command, a local command, a local bundle management package (LBM package), a bundle local management package, a local management package, a local management command package, and a local command package. The LBM may change a state (enabled, disabled, deleted) of a specific bundle through software installed in a terminal, and the like, or may be used for changing (updating) contents (for example, bundle nickname, bundle summary information (bundle metadata), and the like) of the specific bundle. The LBM may include one or more local management commands, and in that case, a target bundle of each local management command may be the same or different for each local management command.

In the disclosure, a target bundle may be used as a term indicating a bundle which is a target of a local management command and a remote management command.

Further, a service provider may request generation of a bundle by issuing a requirement to a bundle management server and may indicate a business that provides a terminal with a service through the corresponding bundle. For example, the service provider may indicate a mobile operator that provides a communication network access service through a bundle including a communication application loaded therein, and may be collectively referred to as all of a business supporting system (BSS) of a mobile operator, an operational supporting system (OSS), a point of sale (POS) terminal, and other IT systems. In the disclosure, the service provider is not limited to representing only one specific business, and may be used as a term indicating a group or association (or consortium) of one or more businesses and a representative representing the corresponding group or association. In addition, the service provider may be referred to as an operator (OP or Op.), a bundle owner (BO), an image owner (IO), and the like, and each service provider may configure at least one name and/or unique identifier (object identifier, OID) or may receive the same which is allocated. If the service provider indicates a group, association, or representative of one or more businesses, a name or a unique identifier of any group, association, or representative may be a name or a unique identifier which is shared among all businesses belonging to the corresponding group or association and all partners of the corresponding representative.

In the disclosure, a network access application (NAA) may be an application such as a USIM or an ISIM which is stored in an UICC so as to access a network. The NAA may be a network access module.

In the disclosure, a telecom bundle may include at least one NAA loaded therein, or may be a bundle having a function of remotely downloading and installing at least one NAA. The telecom bundle may include a telecom bundle identifier indicating the telecom bundle.

In the disclosure, an eSIM bundle may be a bundle in which an eUICC OS operates and functions like an eUICC to enable a terminal to receive a profile. The eSIM bundle may include a telecom bundle identifier indicating the eSIM bundle.

In the disclosure, an eSIM activation code is predetermined information for downloading a profile to an eSIM terminal or an SSP terminal, and may be referred to as an eSIM activation code. The eSIM activation code may include an address of an SM-DS server capable of notifying an SM-DP+ address or an SM-DP+ address which should be accessed so as to download a profile, and may include an activation code token value which may be used as a matching identifier of a specific profile for SM-DP+. When the eSIM activation code is input in the form of a QR code, "LPA:" may be added as the prefix of data included in a QR code.

In the disclosure, an SSP activation code is predetermined information for downloading a bundle to an SSP terminal, and may be referred to as an SSP activation code. A terminal user may start a bundle download procedure by inputting an SSP activation code into an LBA application of an SSP terminal. The SSP activation code may include an eSIM activation code.

An activation code may be collectively referred to as an SSP activation code and an eSIM activation code. In general, in the disclosure, an activation code may be any activation code before determining whether the activation code is an SSP activation code or an eSIM activation code, and, when being input into a terminal, may be interpreted as one of the SSP activation code or the eSIM activation code by the terminal. When the SSP activation code includes the eSIM activation code, the terminal may selectively perform bundle download and profile download.

In the disclosure, a function invoked by LBA may include a function performed in an Si2 interface which is an interface between the LBA and an SPB manager, and in an Si3 interface which is an interface between the LBA and a secondary platform bundle loader. The LBA may transfer parameters to the SPB manager or the secondary platform bundle loader through a specific function. The parameters transferred from the LBA through the specific function call may indicate a command, a function command, or a function instruction of the corresponding function. Upon receiving a function command, the SPB manager or the secondary platform bundle loader may perform a specific operation according to the function command, and then respond to the function command. The response may include the parameters. A function command transferred through the Si3 interface and an operation corresponding thereto, and a response to the function command may be constituted by multiple function commands, operations corresponding thereto, and a response to a sub function command.

The function command transfer through the Si2 interface may use a hypertext transfer protocol (HTTP). In particular, the function command transfer through the Si2 interface may be performed by an HTTP POST request message of the HTTP, and a command may be included in a body portion of the HTTP POST request message to be transferred.

In the disclosure, an object identifier of a management agency may represent an object identifier of an agency that manages a specific family identifier. There may be multiple management agencies with respect to the specific family identifier, and each of the agencies may have an object identifier. An SSP terminal, a service provider, and a bundle management server may know which agency is a main management agent of a bundle, who performs the bundle management including download, through an object identifier of a management agency. In addition, it may be identified which main management agent manages a service which is to be provided through the corresponding bundle, through the object identifier of the management agency.

In the disclosure, SSP information may include first SSP information and second SSP information. The first SSP information is SSP-related information and may include unencrypted data. The first SSP information may be interpreted by LBA and an SPB manager without any special decryption process. The second SSP information may include data obtained by encrypting SSP-related information.

In the disclosure, first bundle information may include metadata, bundle metadata, and secondary platform bundle's metadata. The first bundle information may include unencrypted data that LBA of an SSP terminal may read with respect to a bundle that a service provider or a bundle management server (SPB manager) is to download to the SSP terminal. Based on the first bundle information, the LBA of the SSP terminal may receive user's consent before receiving second bundle information of the corresponding bundle, or may identify whether the user's consent and intention are required with respect to operation/management after the bundle installation. The first bundle information may be used for the LBA to show basic information of a bundle to a user before the bundle installation. After the bundle installation, the first bundle information may be managed by a loader (secondary platform bundle loader, SPBL) and may be updated by the service provider, the bundle management server (SPB manager), and the like.

In the disclosure, encrypted second bundle information may include a bound secondary platform bundle image, a bound bundle (bound secondary platform bundle), an encrypted secondary platform bundle image, and an encrypted bundle (encrypted secondary platform bundle). The second bundle information may include the first bundle information. The second bundle information includes information required for the bundle installation, and an SSP may install a bundle in the SSP by using data extracted from the second bundle information. A part of the second bundle information may be encrypted to a session key generated by the SSP and the SPB manager.

In the disclosure, a bundle information request function may include a function requesting first bundle information and second bundle information of a bundle that the SSP terminal is to install. An operation of requesting the first bundle information and the second bundle information of the bundle may be performed by transmitting a bundle information request function command to the SPB manager. The bundle information request function command may be transferred by the SSP terminal to the SPB manager through the Si2 interface. The SSP terminal may request the first bundle information or the second bundle information by transferring, to the SPB manager, terminal information and SSP credential including SSP certificate, SSP information, and SSP functions (capability). The bundle information request function may be identified by using an identifier or a delimiter included in a command. In another example, the bundle information request function may be identified by defining different commands for the bundle information request function.

In describing the disclosure, when it is determined that detailed description on a related announced function or configuration unnecessarily obscures the main idea of the disclosure, the detailed description is omitted.

Hereinafter, various embodiments will be described. The embodiments relate to a method in which an SSP terminal performs an eSIM profile download procedure in a case in which when the SSP terminal tries to download a bundle, an SPB manager may not process the bundle download.

In particular, the disclosure includes the following embodiment for the purpose above.

A method of transferring, to the SPB manager, the eSIM function capability including whether the SSP terminal holds an eSIM bundle or holds an eSIM activation code, when the SSP terminal requests the bundle download.

A method in which the SPB manager determines whether the corresponding bundle is compatible with the SSP terminal in response to the bundle download request of the SSP terminal.

A method in which the SPB manager transmits an error message and a family identifier-specific error code to the SSP manager to enable the SSP terminal to perform switching to an eSIM profile download procedure in a case in which the SPB manager may not download a bundle to the SSP terminal because there is no bundle compatible with the SSP terminal having requested the bundle download.

A method in which, in the bundle download procedure, the SSP terminal performs switching to other operation such as the switching to an eSIM profile procedure, by applying an eSIM activation code that the SPB manager is holding or the family identifier-specific error code that the SPB manager has transmitted.

Hereinafter, various embodiments relate to a method in which the SSP terminal performs an eSIM profile download procedure in a case in which the SPB manager may not process the bundle download when the SSP terminal tries to perform the bundle download. The embodiments will be described in detail with reference to the drawings.

FIG. 1 is a diagram illustrating internal elements of an SSP terminal and an interface between the elements according to an embodiment of the disclosure.

Referring to FIG. 1, an SSP terminal 101 may be constituted by an SSP 131 and local bundle assistant (LBA) 111 which is terminal software. In addition, the SSP terminal 101 may include: a transceiver for transmitting/receiving a signal to/from other terminal, a base station, a server, and the like; and a controller for controlling the entire operation of the SSP terminal 101. The controller may control an operation of the SSP terminal 101 according to various embodiments. The controller may include at least one processor. The controller may control the SSP 131 through the LBA 111.

The LBA 111 may include a function of local profile assistant (LPA) 112 embedded therein. The SSP 131 is constituted by a secondary platform bundle (SPB bundle), a primary platform 135, and a primary platform interface 134. An SPB loader (SPBL) 132 and an eSIM bundle 133 are a kind of bundle. The LBA 111 and the SPBL 132 exchange a packet through a first interface 122, and the LBA 111 may perform the following through the first interface.

Acquire SSP information

Transmit bundle data to be installed in an SSP to a loader

Manage (activate, deactivate, delete, and the like) a bundle installed in an SSP The LPA 112 and the eSIM bundle 133 installed in the SSP 131 may exchange a packet through a second interface 123, and the LPA 112 may perform a function defined in GSMA SGP.22 with respect to the eSIM bundle 133, through the second interface 123.

Figure 2:
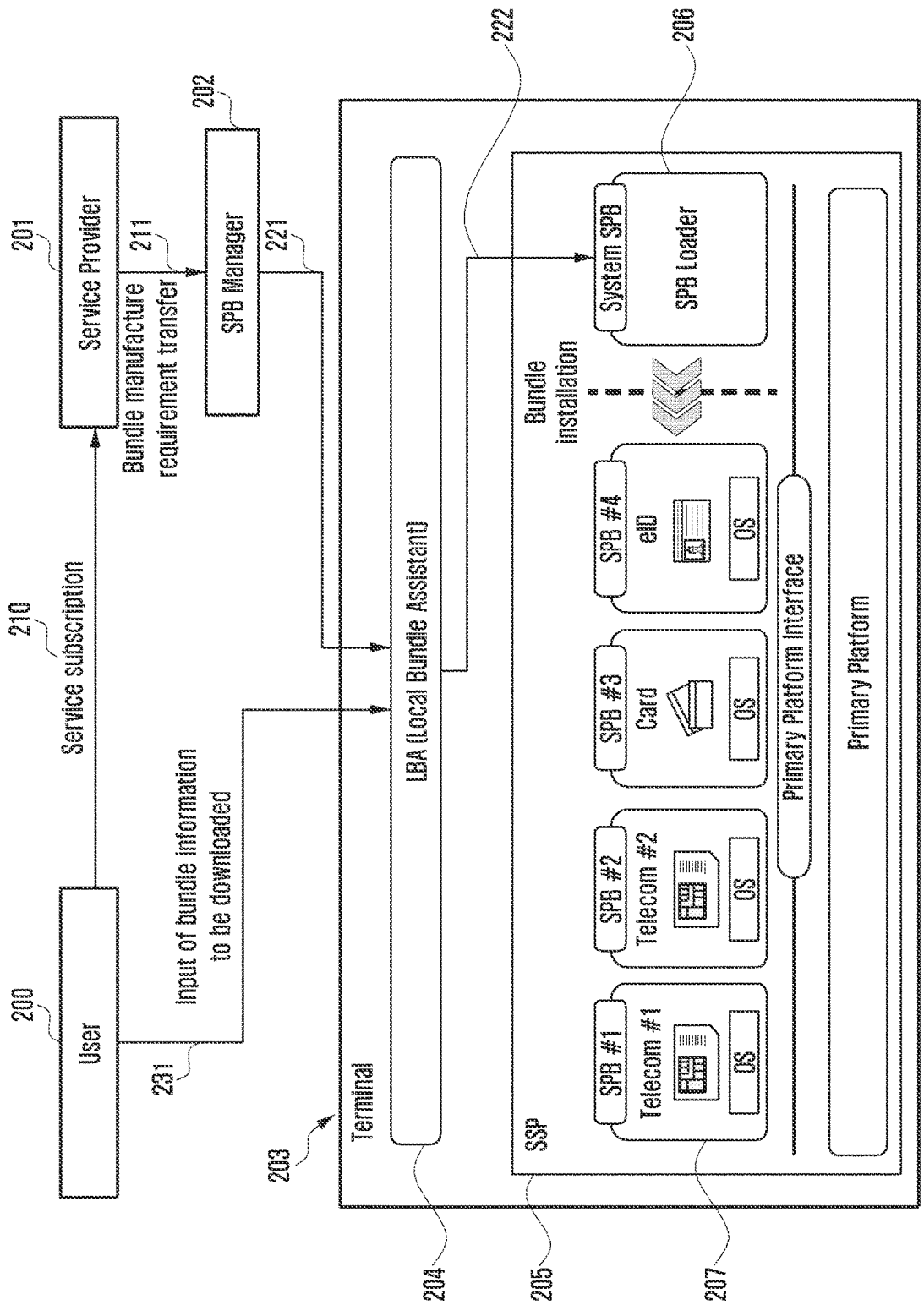
FIG. 2 is a diagram illustrating an example of internal and external elements of a terminal for downloading a bundle by an SSP terminal, according to an embodiment of the disclosure.

FIG. 2 is a diagram illustrating an example of internal and external elements of a terminal for downloading a bundle by an SSP terminal, according to an embodiment of the disclosure. A terminal 203 may correspond to the SSP terminal 101 of FIG. 1. LBA 204 may correspond to the LBA 111 of FIG. 1. An SPB loader 206 may correspond to the SPBL 132 of FIG. 1. A bundle 207 may be a secondary platform bundle (SPB). With respect to the description of the terminal 203, the LBA 204, and the SPB loader 206, the embodiment of FIG. 1 is referred.

Referring to FIG. 2, a user 200 may select a service (for example, data service via a mobile communication network and the like) provided by the user 200 in a service subscription process 210 and may subscribe to the service. In order to use the service provided by a service provider 201, the user 200 may selectively transfer, to the service provider 201, an identifier (SSP ID) of an SSP 205 installed in the terminal 203 to which a bundle is to be installed. According to an embodiment, in the service subscription process 210 of FIG. 2, the user 200 may receive, from the service provider 201, an SSP activation code in the form of a QR code, which enables a bundle to be installed in a user terminal after subscribing to the service. According to an embodiment, the SSP activation code that the user receives after subscribing to a telecom service may include information to download a telecom bundle and an eSIM activation code to download an eSIM profile instead of a telecom bundle.

In a bundle manufacture requirement transfer process 211, the service provider 201 and an SPB manager 202 may perform a bundle download preparation procedure. In the bundle manufacture requirement transfer process 211, the service provider 201 may selectively transfer, to the SPB manager 202, the identifier (SSP ID) of the SSP 205 to which a bundle is to be installed, and may transfer, to the SPB manager 202, at least one of a bundle family identifier (SPB family ID) and a specific bundle identifier (SPB ID) capable of providing a service selected by a subscriber. In the bundle manufacture requirement transfer process 211, the SPB manager 202 may select one of a bundle having the transferred specific bundle identifier or a bundle having the bundle family identifier, and may transfer the identifier of the selected bundle to the service provider 201. In the bundle manufacture requirement transfer process 211, the service provider 201 or the SPB manager 202 may generate a new bundle matching ID capable of identifying the selected bundle. In addition, the SPB manager 202 may connect and manage the transferred SSP identifier (SSP ID) and the selected bundle. In the bundle manufacture requirement transfer process 211, the SPB manager 202 may transfer, to the service provider 201, a bundle management server address (SPB manager address) capable of downloading the selected bundle. The bundle management server address may be an address of a specific or any bundle management server where a prepared bundle is stored, and may be an address of other bundle management server where download information (a server address and the like) of the prepared bundle may be stored and acquired. When, in the bundle manufacture requirement transfer process 211, the service provider 201 requests the preparation of a telecom bundle from the SPB manager 202, information on an eSIM profile matching with the corresponding telecom bundle may be provided together.

When a part of the bundle manufacture requirement transfer process 211 is preceded before the service subscription process 210, the service provider 201 may transfer prepared bundle download information to the user 200 in the service subscription process 210. The bundle download information may selectively transfer at least one of a bundle management server address (SPB manager address) where a bundle is prepared, a bundle matching ID of the prepared bundle, and a bundle family identifier (SPB family ID) of the prepared bundle.

Referring to FIG. 2, in a bundle-to-be-downloaded information input process 231, the bundle download information may be transferred to the LBA 204 of the terminal 203. The bundle download information may be one of an address (SPB manager address) of a bundle management server where the LBA 204 is to access, a bundle delimiter of the bundle prepared in the bundle manufacture requirement transfer process 211, and a bundle family identifier of the prepared bundle. The bundle delimiter may include at least one of a bundle event ID or the bundle matching ID generated in the bundle manufacture requirement transfer process 211. In addition, the bundle delimiter may include the bundle family identifier of the prepared bundle. The bundle event ID may include at least one of a bundle matching ID and an address of a bundle management server of the bundle prepared in the bundle manufacture requirement transfer process 211. The user 200 may input (for example, QR code scanning, direct text input, and the like) an SSP activation code to the LBA 204 or use push-input through an information provision server (not shown) so as to input the bundle download information to the LBA 204. In addition, the LBA 204 may access the information provision server (not shown) preconfigured in the terminal 203 to receive the bundle download information.

The bundle download from the SPB manager 202 to the SSP 205 may be implemented by a function and an operation performed in an interface 221 between the SPB manager 202 and the LBA 204 and in an interface 222 between the LBA 204 and the SPB loader 206. The interface 222 between the LBA 204 and the SPB loader 206 may correspond to the first interface 122 of FIG. 1.

Figure 3:
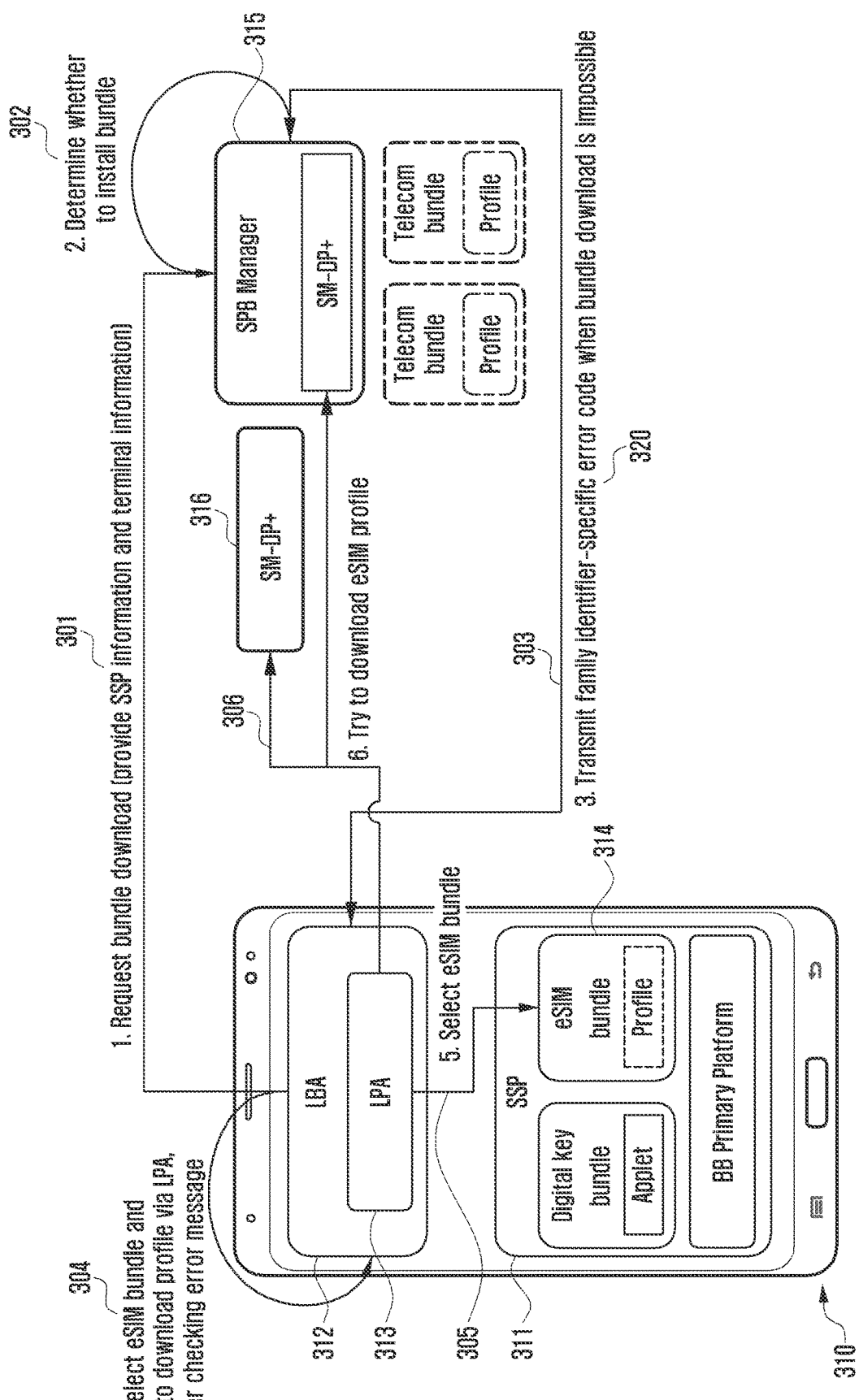
FIG. 3 is a diagram illustrating a process in which an SSP terminal performs switching to an eSIM profile download procedure during the bundle download procedure, according to an embodiment of the disclosure.

FIG. 3 is a diagram illustrating a process in which an SSP terminal 310 performs switching to an eSIM profile download procedure during the bundle download procedure, according to an embodiment of the disclosure.

In particular, FIG. 3 specifies a case in which the SSP terminal 310 requests a telecom bundle.

Referring to FIG. 3, when an SPB manager 315 may not process a bundle download request of the SSP terminal 310, the SPB manager transfers a family identifier-specific error code 320 to the SSP terminal 310, and the SSP terminal 310 may try to perform eSIM profile download by using the response of the SPB manager 315.

In operation 301, LBA 312 of the SSP terminal 310 may request a bundle download from the SPB manager 315. In operation 301, a method in which the LBA 312 acquires information required to request a bundle download may include a method in which the LBA 312 may: receive contents of an SSP activation code as input by a user; scan an SSP activation code in the form of a QR code and receive the same as input; or receive relevant information transmitted from a service provider through other functions of the LBA 312. In operation 301, when requesting the bundle download, the LBA 312 may provide information of an SSP 311 and information of the SSP terminal 310 to the SPB manager 315.

SSP information may include at least one of the following.
  Primary platform information (manufacturer, manufacture's number, serial number, version information)
  SPB loader information (version information)
  A list of bundles installed in an SSP
  A list of eSIM bundles installed in an SSP
  A list of bundles of a specific family identifier installed in an SSP
  A metadata list of bundles installed in an SSP
  A metadata list of eSIM bundles installed in an SSP
  A metadata list of bundles of a specific family identifier installed in an SSP Terminal information may include at least one of the following.
  A version of LBA
  A version of a European Telecommunications Standards Institute (ETSI) SSP TS 103 666-2 iSSP standard document used to implement LBA
  A version of LPA
  A version of a GSMA SGP.22 standard document used to implement LPA
  Whether an eSIM profile can be installed
  Whether to hold an eSIM activation code
  Whether a modem can be used A procedure in which operation 301 is performed may be operation before or after the SSP terminal 310 and the SPB manager 315 are mutually authenticated based on a digital certificate during the bundle download procedure.

In operation 302, the SPB manager 315 may determine whether a bundle can be installed in the SSP terminal 310, based on terminal information and SSP information transferred from the SSP terminal 310 by operation 301.

In operation 302, the SPB manager 315 may determine as follows.
  Determine whether to request a bundle of a supportable family identifier
  Determine whether a version of LBA and a version of a loader (SPB loader) inside an SSP are supportable, based on the SSP information and the terminal information
  Determine whether a bundle that the SPB manager 315 is holding is compatible with the SSP terminal 310, based on the SSP information Based on the determination, the SPB manager 315 may support a family identifier of the bundle requested by the SSP terminal 310, and may continue to perform the bundle download procedure by normally responding to the request of the SSP terminal 310 when it is determined that versions of the LBA and the loader of the SSP terminal 310 are supportable and the requested bundle is compatible with the SSP terminal 310. If it is determined that the bundle download procedure may not be continued, the determination may be performed as follows.
  Determine whether the SSP terminal 310 holds an eSIM bundle 314, based on the SSP information and the terminal information
  Determine whether a profile that the SPB manager 315 is holding can be installed in the eSIM bundle 314 of the SSP terminal 310, based on the SSP information and the terminal information
  Determine whether a specific profile can be installed in the eSIM bundle 314 of the SSP terminal 310, based on the SSP information and the terminal information
  Determine whether the SPB manager can install a bundle applet in the SSP terminal 310, based on the SSP information and the terminal information When the SPB manager 315 determines that there is no bundle that the SSP terminal 310 can install, but the SSP terminal 310 can perform switching to eSIM profile download or applet download, based on the determination above, the SPB manager 315 may transfer the family identifier-specific error code 320 to the SSP terminal 310 in accordance with operation 303.

The family identifier-specific error code 320 may include at least one of the following pieces of information.
  A family identifier-specific error code indicator
  A family identifier of a bundle
  "An RSP switching indicator" instructing that the switching to an eSIM profile download procedure is possible
  Contents (an SM-DP+ address, an AC_TOKEN, an SM-DP+ OID, and the like) of an eSIM activation code which is information required to perform eSIM download
  An indicator which informs that the bundle download is not possible, but the applet of the corresponding bundle may be downloaded
  Information (an SKMS address, applet information) required to perform bundle applet download According to an embodiment, when the SSP terminal 310 requests a telecom bundle, but the SPB manager 315 wants to inform that the bundle download is impossible and the eSIM profile switching is possible, the SPB manager 315 may transmit the family identifier-specific error code, which includes a family identifier-specific error code indicator, a family identifier of a bundle, and an RSP switching indicator among the pieces of information, and may selectively transmit an eSIM activation code.

According to operation 304, the LBA 312 of the SSP terminal 310 may determine as follows, based on the family identifier-specific error code and an error message which are sent by the SPB manager 315.
  Why the bundle download fails.
  The family identifier-specific error code is transferred from the SPB manager 315.
  The eSIM profile download may be tried by using the family identifier-specific error code transferred by the SPB manager 315.

The bundle applet download may be tried by using the family identifier-specific error code transferred by the SPB manager 315.

The eSIM profile download may be tried by using the eSIM activation code included in the SSP activation code that the LBA 312 receives as input.

According to operation 305, the LBA 312 may prepare to download a profile by selecting one of eSIM bundles 314 which are installed in the SSP 311 by using a function of LPA 313.

When operation 305 has been successfully performed, the LPA 313 may request the eSIM profile download from the SPB manager 315 or SM-DP+ 316 by using the information transferred by the LBA 312 in accordance with operation 306. In operation 306, an eSIM profile download protocol may comply with the GSMA SGP.22 standard.

According to an embodiment, in operation 305, although the error message transferred from the SPB manager 315 does not include eSIM activation code information, when, as shown in the service subscription process 210 of FIG. 2, a user subscribes to a telecom service and then tries to perform the bundle download by using the SSP activation code including the eSIM activation code, the LBA 312 may try an eSIM profile download procedure by transferring the eSIM activation code information to the LPA 313.

In operation 305, a case in which a family identifier of the bundle that the SSP terminal 310 has requested in operation 301 is not telecom may include the following situations.

The SM-DP+ 316 may be other server which support download of the applet inside the bundle that the SSP terminal 310 has requested in operation 301.

The main agent requesting the applet download may be another object inside the LBA 312, not the LPA 313.

In operation 306, an applet download protocol may comply with other standard.

Figure 4A:
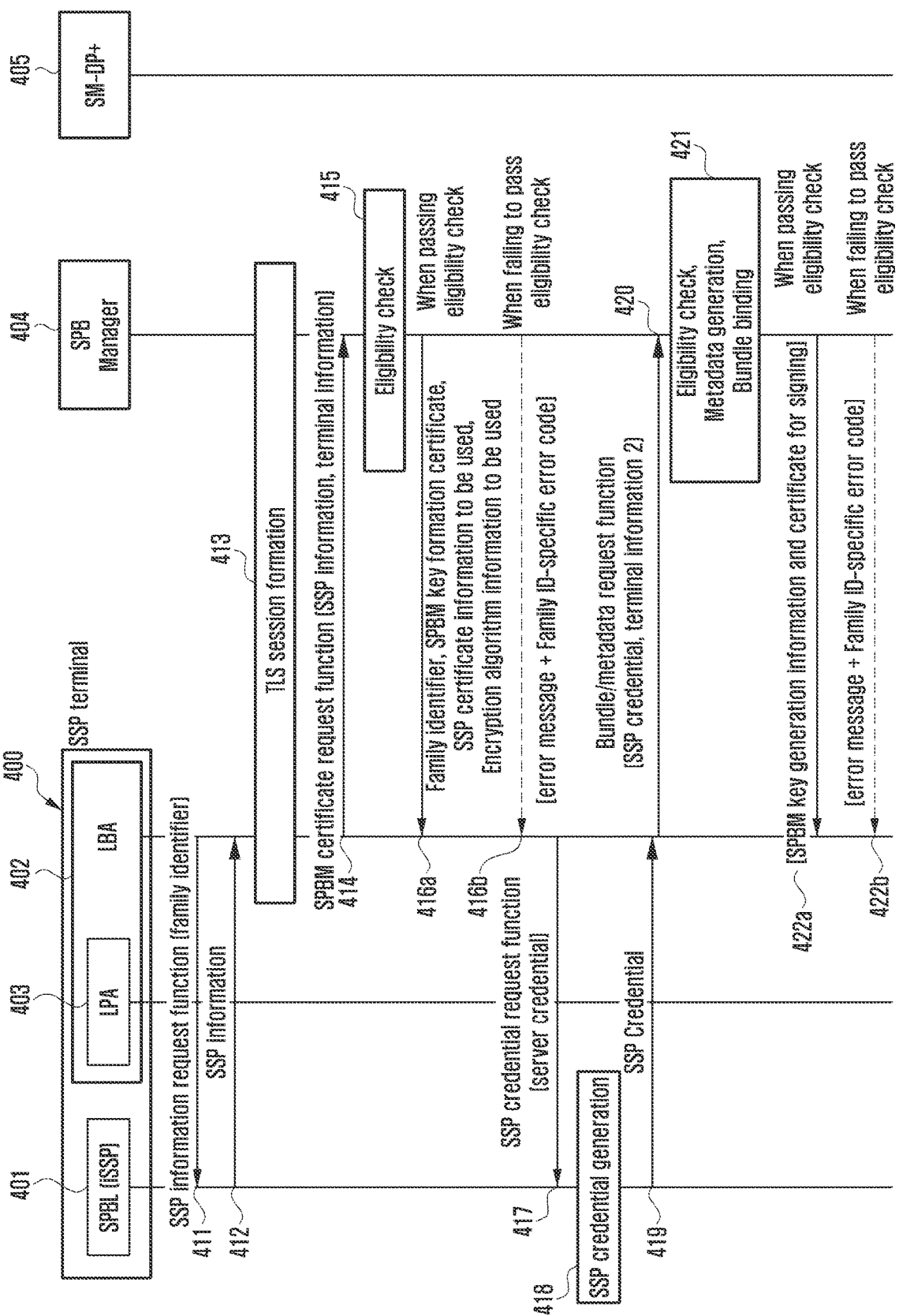
FIG. 4A is a diagram illustrating a flow chart of a procedure in which an SSP terminal receives a family identifier-specific error code from an SPB manager, according to an embodiment of the disclosure.

FIG. 4A is a diagram illustrating a flow chart of a procedure in which an SSP terminal 400 receives a family identifier-specific error code from an SPB manager 404, according to an embodiment of the disclosure.

Operations 411-414 of FIG. 4A are a part of a procedure in which the SSP terminal 400 requests a bundle download from the SPB manager 404.

Referring to FIG. 4A, in operation 411, LBA 402 of the SSP terminal 400 transmits, to an SPB loader (SPBL) 401 in an SSP, a function requesting SSP information for installing a bundle in the SSP. The LBA 402 may transmit, to the SPBL 401, a family identifier of a bundle to be installed. Upon receiving the SSP information request function, the SPBL 401 may transfer SSP information to the LBA 402 in operation 412.

In operation 413, the LBA 402 may establish a transport layer security (TLS) connection with a server of the SPB manager 404 which is to request a bundle download.

In operation 414, the LBA 402 may invoke a Secondary Platform Bundle Manager (SPBM) certificate request function from the SPB manager 404. When the function is invoked, the LBA 402 may transfer SSP information and terminal information to the SPB manager 404. With respect to the transferred SSP information and terminal information, operation 301 of FIG. 3 may be referred.

In operation 415, the SPB manager 404 may determine whether a bundle can be installed in the SSP terminal 400. With respect to the determination that the SPB manager 404 performs in operation 415, the determination that the SPB manager 315 performs in operation 302 of FIG. 3 may be referred. In addition, in operation 415, the SPB manager 404 may perform the following operations.

A family identifier of a bundle may be selected.

An object identifier of a management agency that manages a family identifier of a bundle may be selected.

An SPBM key generation certificate (CERT.SPBM.KA) and a certificate chain to verify the same may be selected.

CI information of a certificate to be used by an SSP may be selected.

Information of cipher algorithm to be used by an SSP for data cipher may be selected.

When the SPB manager 404 determines that a bundle can be installed in the SSP terminal 400 in operation 415, the SPB manager may send a response including the following information to the LBA 402 in accordance with operation 416a.

A family identifier

An SPBM key generation certificate (CERT.SPBM.KA) and a certificate chain to verify the same CI information of a certificate to be used by an SSP Information of cipher algorithm to be used by an SSP for data cipher In addition, in operation 416a, the SPB manager 404 may send, to the LBA 402, a response selectively including cipher algorithm information to be used by the SSP.

When the SPB manager 404 has determined that a bundle may not be installed in the SSP terminal 400 in operation 415, the SPB manager may transfer an error message and a family identifier-specific error code to the LBA 402 in accordance with operation 416b. Contents of the family identifier-specific error code may be the same as that of the family identifier-specific error code 320 of FIG. 3. Upon receiving the response of the SPB manager 404 according to operation 416a, the LBA 402 may invoke an SSP credential request function from the SPBL 401. In the SSP credential request function of operation 416a, the LBA 402 may transfer server credential to the SPBL 401, and the server credential may include at least one of the following.

A family identifier

An SPBM key generation certificate (CERT.SPBM.KA) and a certificate to verify the same CI information of a certificate to be used by an SSP Information of cipher algorithm to be used by an SSP for data cipher Bundle code matching information (CODE_M)

A family identifier, an SPBM key generation certificate (CERT.SPBM.KA) and a certificate to verify the same, CI information of a certificate to be used by an SSP, and information of cipher algorithm to be used by an SSP for data cipher may be information that the SPB manager 404 has sent to the LBA 402 as a response in operation 416a.

In addition, the server credential may selectively include bundle code matching auxiliary information (challenge_S).

According to operation 418, upon receiving the SSP credential request function, the SPBL 401 may generate SSP credential, based on the received server credential. An SSP credential generating operation may include the following.

Verify an SPBM key generation certificate (CERT.SPBM.KA)

Select a certificate for SPBL signing according to CI information of a certificate to be used by an SSP Generate an SPBL ephemeral key (ephemeral key pair)

Generate ID_TRANSAC which may be used as a session ID

Generate a first session key (session key 1), based on a secret key (eSK.SPBL.KA) of an SPBL ephemeral key and a public key (PK.SPBM,KA) included in an SPBM key generation certificate Generate sspImageSeesionToken including an SPBL ephemeral key and generate sspImageSessionToken-Signature signed by a secret key (SK.SPBL.DS) corresponding to a certificate (CERT.SPBL.DS) for SPBL signing with respect to sspImageSessionToken Generate second SSP information. The second SSP information may include the SSP information mentioned in operation 301 of FIG. 3 and a primary platform identifier.

Generate sspToken including at least one of bundle code matching information (CODE_M), bundle code matching auxiliary information (challenge_S), and the generated second SSP information, and generate sspTokenSignature signed by a secret key corresponding to a certificate (CERT.SPBL.DS) for SPBL signing with respect to sspToken Generate first integrity check information (sspH1) and first encryption information (sspM1) by encrypting a certificate (CERT.SPBL.DS) for SPBL signing by means of the generated first session key. When the first encryption information (sspM1) and the first integrity check information (sspH1) are generated, the generated sspToken and sspTokenSignature may be encrypted together with a certificate (CERT.SPBL.DS) for SPBL signing.

The generated sspToken and sspTokenSignature may be encrypted separately from the certificate for SPBL signing to be generated as second encryption information (sspM2) and second integrity check information (sspH2).

Generate SSP credential including at least one of a certificate chain of a certificate (CERT.SPBL.DS) for SPBL signing, the generated sspImageSessionToken, the generated sspImageSessionTokenSignature, the generated sspToken, the generated sspTokenSignature, the generated first encryption information (sspM1), the generated first integrity check information (sspH1), the generated second encryption information (sspM2), and the generated second integrity check information (sspH2).

In operation 419, the SPBL 401 may transmit the generated SSP credential to the LBA 402 in response to the SSP credential request function. If an error occurs in any action of operation 418, the SPBL 401 may send an error message as a response and finish the procedure.

In operation 419, upon receiving the SSP credential transferred from the SPBL 401, the LBA 402 may invoke a bundle/metadata request function from the SPB manager 404 in accordance with operation 420. When the LBA 402 invokes a bundle/metadata request function, the LBA 402 may transfer the following information to the SPB manager 404.

SSP credential transferred from the SPBL 401

Terminal information including some of a version of LBA, a version of LPA, whether an eSIM profile can be installed, whether to hold an eSIM activation code, and whether a modem can be used Upon receiving the SSP credential and the terminal information transferred from the LBA 402, in operation 420, the SPB manager 404 may perform at least one of the following operations according to operation 421, based on the transferred SSP credential and terminal information.

An operation including at least one of the decisions that the SPB manager 315 has made in operation 302 of FIG. 3

Generate a first session key by using a public key (ePK.SPBL.KA) of an SPBL ephemeral key and eSK-.SPBM.KA, namely a private key which makes a pair with ePK.SPBM.KA which is a public key of an SPBM key generation certificate Decrypt first encryption information (sspM1) and verify sspTokenSignature by using a first session key Verify a certificate (CERT.SPBL.DS) for SPBL signing and a certificate chain thereof Verify contents of sspImageSessionToken and effectiveness of sspImageSessionTokenSignature Verify contents of sspToken and effectiveness of sspTokenSignature Determine whether to hold a bundle indicated by CODE_M existing in the sspToken Determine whether a bundle indicated by CODE_M existing in the sspToken can be installed in an SSP terminal Determine if a primary platform identifier is supportable In operation 421, when all of the operations of the SPB manager 404 have been performed without any verification failure, the SPB manager 404 may perform at least one of the following operations.

Generate TIME STAMP and encrypt the same by means of a first session key

Prepare metadata (bundle metadata) of a bundle (bundle specified by CODE_M) to be transferred to the SSP terminal 400

Generate an SPBM ephemeral key pair (ePK.SPBM.KA, eSK. SPBM.KA)

Generate a second session key by using the SPBM ephemeral private key (eSK.SPBM.KA) and ePK.SPBL.KA extracted from the SSP credential Select an SPBM certificate for signing and prepare a certificate chain which may verify an SPBM certificate for signing Generate SpbmToken including the generated SPBM ephemeral public key (ePK.SPBM.KA) and ID_TRANSAC included in the received SSP credential Generate SpbmTokenSignature using the generated spbmToken as a secret key corresponding to an SPBM certificate for signing Encrypt an image descriptor of a bundle to be transferred by means of a second session key Encrypt an ARP token by means of a second session key Encrypt a segment descriptor structure of a bundle to be transferred by means of a second session key. A segment descriptor structure may include key information which may decrypt a bundle segment to be in an installable form.

Generate an encrypted bundle. The encrypted bundle may include bundle metadata, an SPBM certificate for signing, a chain of an SPBM certificate for signing, the generated spbmToken, the generated spbmTokenSignature, the encrypted TIME STAMP, an ARP token and segment descriptor structures which are encrypted by the second session key, and bundle segments to be transferred to a terminal. The encrypted bundle may include a value indicating the number of segment descriptor structures and segments.

According to operation 422a, after metadata (bundle metadata) and an encrypted bundle (encrypted secondary platform bundle) are generated, the SPB manager 404 may send, to the LBA 402, a response including one of the generated bundle metadata and the generated encrypted bundle in response to the bundle/metadata request function.

In operation 421, when at least one of the operations of the SPB manager 404 fails to be verified, the SPB manage 404 may determine as follows.

Determine effectiveness of an eSIM bundle installed in an SSP terminal

Determine whether it is possible to support a profile which can be installed in an eSIM bundle installed in an SSP terminal Determine whether an SSP terminal holds an eSIM activation code According to operation 422b, the SPB manager 404 may send an error message and a family identifier-specific error code as a response to the bundle/metadata request function. The family identifier-specific error code may correspond to the family identifier-specific error code 320 of FIG. 3.

In operation 421, when it is determined that the SSP terminal 400 does not have capability of installing an eSIM profile, or the SPB manager 404 cannot support an eSIM profile for the SSP terminal 400, the SPB manager 404 may send only an error message without a family identifier-specific error code as a response.

According to operations 416b and 422b, upon receiving the family identifier-specific error code, the LBA 402 may finish the bundle download procedure and proceed the next operation according to the contents of the family identifier-specific error code. For example, the next operation may be to perform an eSIM profile download procedure or to perform a bundle applet download procedure.

Figure 4B:
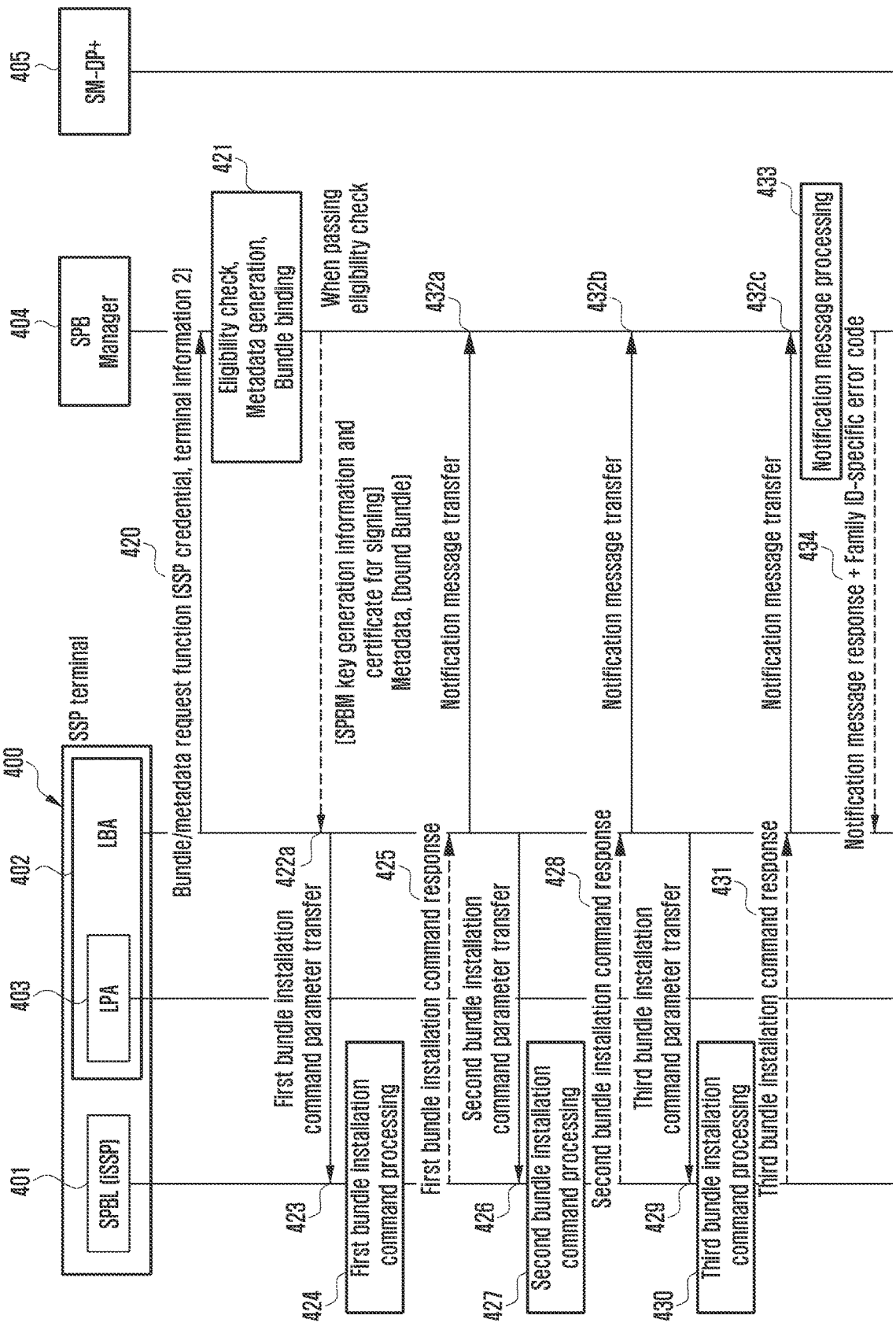
FIG. 4B is a diagram illustrating a flow chart of a procedure in which, LBA transfers a notification message to an SPB manager, and in response thereto, an SSP terminal receives a family identifier-specific error code when the SSP terminal fails to install an encrypted bundle received from the SPB manager according to an embodiment of the disclosure.

FIG. 4B is a diagram illustrating a flow chart of a procedure in which, the LBA 403 transmits a notification message to the SPB manager 404, and in response thereto, the SSP terminal 400 receives a family identifier-specific error code when the SSP terminal 400 fails to install an encrypted bundle received from the SPB manager 404 according to an embodiment of the disclosure.

Operations 420, 421, and 422a may be the same as FIG. 4A.

Referring to FIG. 4B, upon receiving a bundle (bound bundle) having been encrypted by operation 422a, the LBA 402 may transfer, to the SPBL 401, a first bundle installation command parameter which is a part of data of the bundle having been encrypted in operation 423. The first bundle installation command parameter may include the following information.

Bundle metadata included in an encrypted bundle received from the SPB manager 404 in operation 422a An SPBM certificate for signing and a chain of an SPBM certificate for signing included in an encrypted bundle received from the SPB manager 404 in operation 422a spbmToken included in an encrypted bundle received from the SPB manager 404 in operation 422a and spbmTokenSignature which signs spbmToken. spbmTokenSignature may be verified by means of the SPBM certificate for signing.

An encrypted image descriptor and an integrity check value

Encrypted TIME STAMP and an integrity check value

Encrypted an ARP token and an integrity check value

Cipher algorithm used for encrypting the encrypted image descriptor, TIME STAMP, and ARP token In operation 424, upon receiving the first bundle installation command parameter, the SPBL 401 performs a first bundle installation command processing operation. The first bundle installation command parameter processing may include the following operations.

Verify a certificate for signing (SPBM certificate for signing) of a SPB manager, which is included in a first bundle installation command parameter and a certificate chain thereof. In operation 418, the corresponding certificate verification may be performed by using the public key having been used to verify the SPBM key formation certificate and the certificate chain thereof Verify spbmTokenSignature included in a first bundle installation command parameter. spbmTokenSignature may be verified by means of a public key of the SPBM certificate for signing.

Verify if a value of IdTransac in the spbmToken included in a first bundle installation command parameter is the same as a value of ID_TRANSAC generated in operation 418, with respect to the same session Generate a second session key by using an SPBL ephemeral private key (eSK.SPBL.KA) generated in operation 418 and an SPBM ephemeral public key (ePK.SPBM.KA) in the spbmToken included in a first bundle installation command parameter Decrypt the TIME STAMP encrypted by using the first session key generated in operation 418, and identify integrity through an integrity check value Decrypt the image descriptor and ARP token which are encrypted by using the second session key, and identify integrity through an integrity check value of each of them Identify a bundle family identifier and a bundle identifier in the decrypted image descriptor Store bundle metadata included in a first bundle installation command parameter. Identify whether the bundle family identifier and the bundle identifier in the bundle metadata are the same as the value in the image descriptor In operation 425, the SPBL 401 may send a first bundle installation command response to the LBA 403. When operation 424 has been successfully performed, the SPBL 401 may send, to the LBA 403, a message indicating that the first bundle installation command parameter processing has been normally performed, as a first bundle installation command response. When operation 424 has not been successfully performed, the SPBL 401 may send, to the LBA 403, a message indicating that the first bundle installation command parameter processing fails, as a first bundle installation command response. The first bundle installation command response may include a reason for the failure of the first bundle installation command parameter processing. The failure of the first bundle installation command parameter processing may occur because the SPBM certificate for signing is not valid, the bundle identifier is not correct, the bundle family identifier is not correct, or a bundle to be installed is not compatible with an SSP.

In operation 426, upon receiving the first bundle installation command response indicating that the first bundle installation command processing has been successfully performed, the LBA 403 may transfer, to the SPBL 401, a second bundle installation command parameter which is a part of data of the encrypted bundle. The second bundle installation command parameter may include the following information.

A segment descriptor structure encrypted by a second session key

In operation 427, upon receiving the second bundle installation command parameter, the SPBL 401 may perform a second bundle installation command processing operation. The second bundle installation command parameter processing may include the following operations.

Decrypt a segment descriptor structure, which is encrypted by the second session key of the second bundle installation command, by means of a second session key Acquire key information to decrypt a bundle segment from the decrypted segment descriptor structure In operation 428, the SPBL 401 may send a second bundle installation command response to the LBA 403. When operation 427 has been successfully performed, the SPBL 401 may send, to the LBA 403, a message indicating that the second bundle installation command parameter processing has been normally performed, as a second bundle installation command response. When operation 427 has not been successfully performed, the SPBL 401 may send, to the LBA 403, a message indicating that the second bundle installation command parameter processing fails, as a second bundle installation command response. The second bundle installation command response may include a reason for the failure of the second bundle installation command parameter processing. The failure of the second bundle installation command parameter processing may occur because the decryption of the encrypted segment descriptor structure fails or a value of the decrypted segment descriptor structure is not valid.

In operation 429, upon receiving the second bundle installation command response indicating that the second bundle installation command processing has been successfully performed, the LBA 403 may transfer, to the SPBL 401, a third bundle installation command parameter which is a part of data of the encrypted bundle. The third bundle installation command may include the following information.

- A bundle segment. The corresponding bundle segment may be decrypted by the key information that the SPBL 401 has acquired from the second bundle installation command parameter processing in operation 427, and may be thus applied to the bundle installation.

In operation 430, upon receiving the third bundle installation command parameter, the SPBL 401 performs a third bundle installation command processing operation. The third bundle installation command parameter processing may include the following operations.

- Decrypt the bundle segment included in the third bundle installation command parameter by using a bundle segment decryption key acquired from the second bundle installation command parameter processing
- Apply the decrypted bundle segment to the bundle installation In operation 431, the SPBL 401 may send a third bundle installation command response to the LBA 403. When operation 430 has been successfully performed, the SPBL 401 may send, to the LBA 403, a message indicating that the third bundle installation command parameter processing has been normally performed. When operation 430 has not been successfully performed, the SPBL 401 may send, to the LBA 403, a message indicating that the third bundle installation command parameter processing fails. A third bundle installation command response may include a reason for the failure of the third bundle installation command parameter processing. The reason of the failure of the third bundle installation command parameter processing may be the failure of the bundle segment decryption, the failure of the installation of the decrypted bundle segment in an SSP, incompatibility of the decrypted bundle segment with an SSP, incompatibility of the installed bundle with an SSP, incompliance of the installed bundle to a valid format, or inoperativeness of the installed bundle.

The LBA 402 and the SPBL 401 may repeat operations 428-431 until all bundle segments included in the encrypted bundle received from the SPB manager 404 are transferred. The encrypted bundle may include the number of the bundle segments to be transferred.

Upon receiving the first bundle installation command response by operation 425, the LBA 402 may transfer a notification message to the SPB manager 404 in accordance with operation 432a. According to the first bundle installation command response the notification message may include a reason for the success of the first bundle installation command parameter processing or the failure of the first bundle installation command parameter processing. The failure of the first bundle installation command parameter processing may occur because the SPBM certificate for signing is not valid, the bundle identifier is not correct, the bundle family identifier is not correct, or a bundle to be installed is not compatible with an SSP.

Upon receiving the second bundle installation command response by operation 428, the LBA 402 may transfer a notification message to the SPB manager 404 in accordance with operation 432b. According to the second bundle installation command response, the notification message may include a reason for the success of the second bundle installation command parameter processing or the failure of the second bundle installation command parameter processing. The failure of the second bundle installation command parameter processing may occur because the decryption of the encrypted segment descriptor structure fails or a value of the decrypted segment descriptor structure is not valid.

Upon receiving the third bundle installation command response by operation 431, the LBA 402 may transfer a notification message to the SPB manager 404 in accordance with operation 432c. According to the third bundle installation command response, the notification message may include a reason for the success of the third bundle installation command parameter processing or the failure of the third bundle installation command parameter processing, or a fact that all segments of a bundle are normally installed. The reason for the failure of the third bundle installation command parameter processing may include the failure of the bundle segment decryption, the failure of the installation of the decrypted bundle segment in an SSP, incompatibility of the decrypted bundle segment with an SSP, incompatibility of the installed bundle with an SSP, incompliance of the installed bundle to a valid format, or inoperativeness of the installed bundle.

According to operation 433, the SPB manager 404 may process contents of the notification message transferred by the LBA 402. The notification message transferred by the LBA 402 may be one of operations 432a, 432b, and 432c. The notification message transferred by the LBA 402 in operations 432a, 432b, and 432c may include terminal information including some of a version of LPA, whether an eSIM profile can be installed, whether to hold an eSIM activation code, and whether a modem can be used. The notification message transferred by the LBA 402 in operations 432a, 432b, and 432c may include the SSP information and the terminal information which have been transferred in operation 301 of FIG. 3.

According to the contents of the notification message that the SPB manager 404 has received, the SPB manage 404 may determine as follows.

- A bundle is normally installed in the SSP terminal 400.
- Bundle installation in the SSP terminal 400 fails.
- The SPBL 401 of the SSP terminal 400 determines that the encrypted bundle is not valid.
- The SPBL 401 of the SSP terminal 400 determines that the encrypted bundle is not compatible with the corresponding SSP and the primary platform.

Determine whether a profile may be installed instead of a telecom bundle when a bundle to be installed is a telecom bundle and the bundle installation in the SSP terminal 400 fails A process of determining whether the SPB manager 404 may install a profile may include the following.

Determine effectiveness of an eSIM bundle installed in an SSP terminal

Determine whether it is possible to support a profile which can be installed in an eSIM bundle installed in an SSP terminal Determine whether an SSP terminal holds an eSIM activation code According to operation 434, the SPB manager 404 may send a notification message response with respect to the notification message transferred from the LBA 402. In operation 434, the notification message response sent by the SPB manager 404 may include a family identifier-specific error code. The family identifier-specific error code may be the same as the family identifier-specific error code 320 of FIG. 3. The LBA 402 may download a profile through eSIM remote SIM provisioning (RSP), based on the notification message response transferred by the SPB manager 404 in operation 434. An embodiment of downloading a profile to eSIM RSP after receiving the notification message response will be described in detail in FIG. 5B.

Figure 5A:
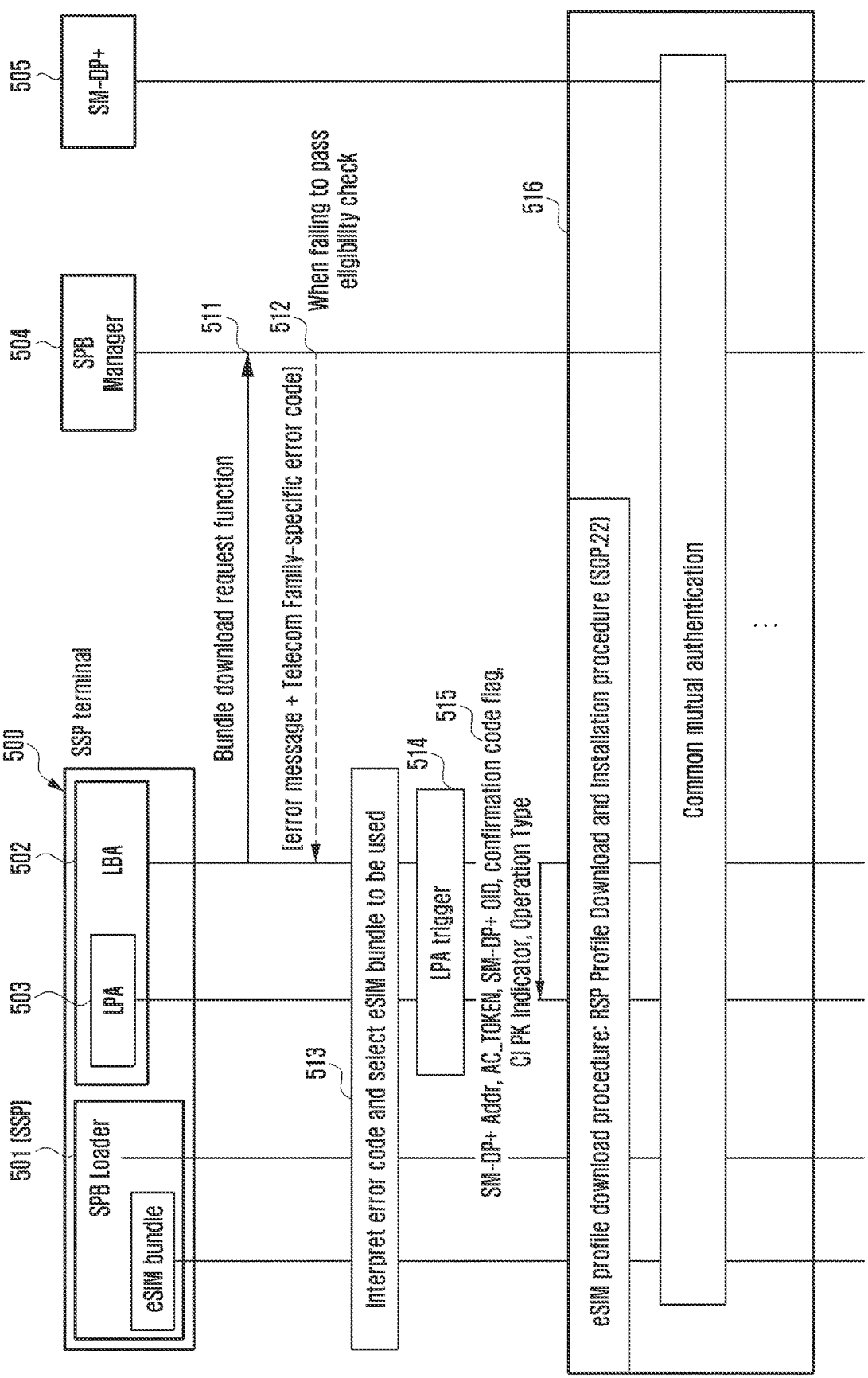
FIG. 5A is a diagram illustrating the next operation when LBA of an SSP terminal receives a family identifier-specific error code transferred from an SPB manager during the bundle download procedure according to an embodiment of the disclosure.

FIG. 5A is a diagram illustrating the next operation when LBA 502 of an SSP terminal 500 receives a family identifier-specific error code transferred from an SPB manager 504 during the bundle download procedure according to an embodiment of the disclosure.

In particular, FIG. 5A illustrates an example of a case in which the SSP terminal 500 requests a download of a telecom bundle.

Referring to FIG. 5A, according to operation 511, the LBA 502 may invoke a bundle download request function from the SPB manager 504. The bundle download request function may be one of the SPBM certificate request function of operation 414 of FIG. 4A or the bundle/metadata request function of operation 420 of FIG. 4A.

In operation 511, although the SPB manager 504 receives a bundle download request from the LBA 502, the SPB manager may not continue the bundle download procedure, and in order to enable the SSP terminal 500 to perform the eSIM profile download procedure, the SPB manager 504 may transmit, to the LBA 502, an error message and a family identifier-specific error code in accordance with operation 512. In particular, FIG. 5A specifies a case in which the SSP terminal 500 requests a telecom bundle, and the family identifier-specific error code transmitted in operation 512 may be referred to as a telecom family-specific error code.

According to operation 513, upon receiving the telecom family-specific error code, the LBA 502 may finish the bundle download procedure and select an eSIM bundle capable of downloading an eSIM profile. An operation of selecting an eSIM bundle may include the following.

Select an eSIM bundle installed in an SSP

When the selected eSIM bundle is in a disabled state, activate the corresponding eSIM bundle through the LBA 502 and a loader (SPB loader) 501

According to operation 514, the LBA 502 enables LPA 503 to start the eSIM profile download procedure, and may transfer eSIM activation code information including an SM-DP+ address, an AC_TOKEN, an SM-DP+ OID, and the like in accordance with operation 515. The information that the LBA 502 transmits to the LPA 503 may indicate contents of an eSIM activation code included in the SSP activation code that the LBA 502 has received as input or the telecom family-specific error code having been transferred from the SPB manager 504 in operation 512. The contents of the telecom family-specific error code may include the following.

"An RSP switching indicator" instructing that the switching to an eSIM profile download procedure is possible eSIM activation code information (fully qualified domain name (FQDN) of an SM-DP+ server which is a server for providing an eSIM profile, an AC_Token (MatchingID) capable of indicating an eSIM profile to be downloaded, and the like)

According to an embodiment, when the SPB manager 504 does not directly hold eSIM activation code information such as the SM-DP+ and the AC_Token, the SPB manager 504 may transfer, to the LBA 502, the telecom family-specific error code constituted by an RSP switching indicator without including the contents of the eSIM activation code.

The telecom family-specific error code may selectively include selections defined in GSMA SGP.22, such as an object identifier of SM-DP+.

After operation 512 is performed, operations 514 and 515 may be followed by operation 513.

After operations 513, 514, and 515 are performed, according to operation 516, the eSIM bundle and the LPA 503 may perform the profile download procedure defined in GSMA SGP.22 to download an eSIM profile to an eSIM bundle.

FIG. 5B is a diagram illustrating the next operation when the LBA 502 of the SSP terminal 500 receives a family identifier-specific error code transferred from the SPB manager 504 during the bundle download procedure according to an embodiment of the disclosure.

In particular, FIG. 5B illustrates an example of a case in which the SSP terminal 500 requests a download of a telecom bundle.

Referring to FIG. 5B, according to operation 511a, the LBA 502 may transfer a notification message to the SPB manager 504. Operation 511a may be one of operations 432a, 432b, or 432c of FIG. 4B. Upon receiving the transferred notification message, the SPB manager 504 may respond to the notification message in accordance with operation 512a. In operation 512a, a notification message response may include a family identifier-specific error code. Operation 512a may be operation 433 of FIG. 4B.

Figure 6A:
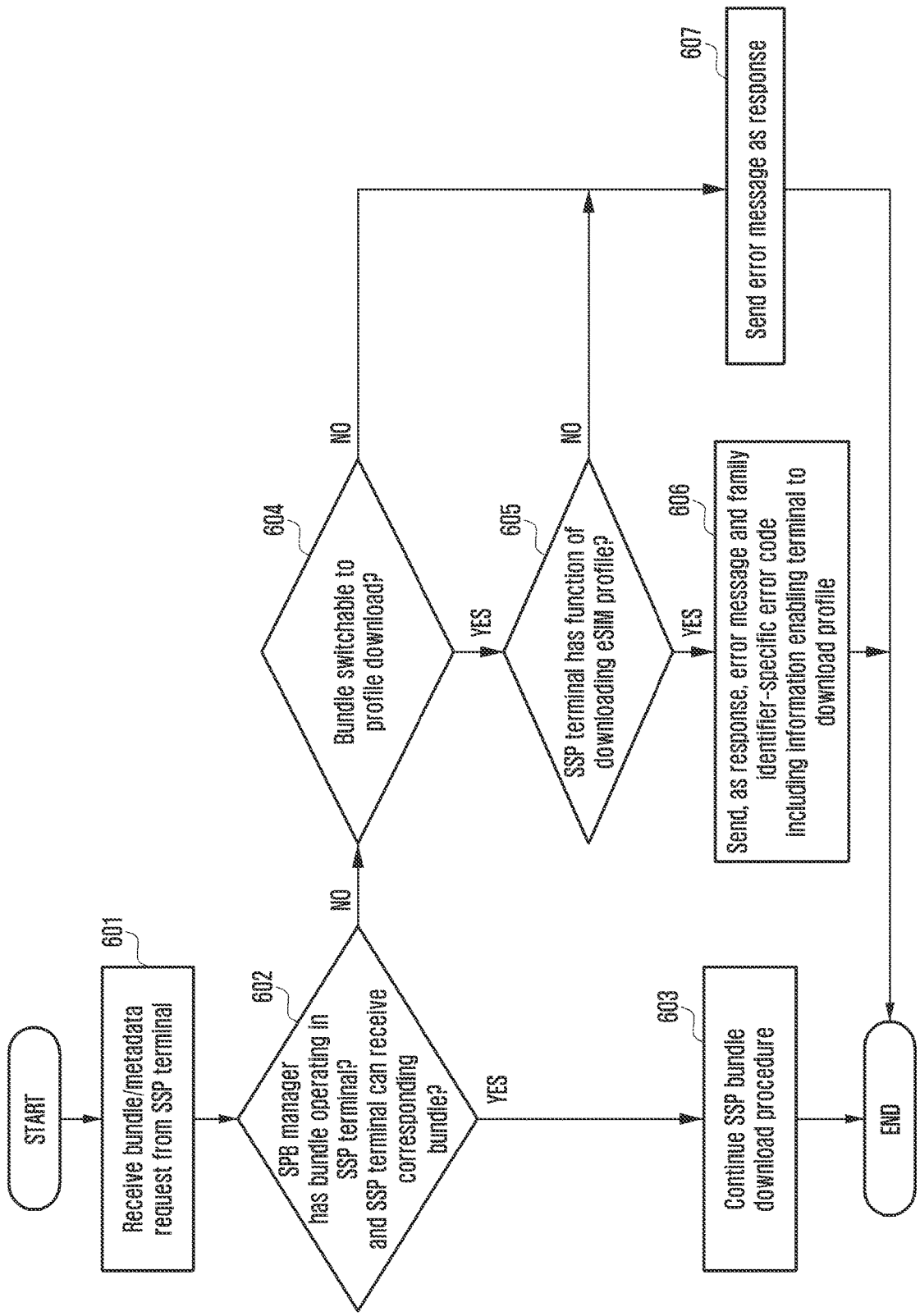
FIG. 6A is a diagram illustrating a flow chart of an SPB manager's operation when the SPB manager receives a bundle download request from an SSP terminal according to an embodiment of the disclosure.

FIG. 6A is a diagram illustrating a flow chart of an SPB manager's operation when the SPB manager receives a bundle download request from an SSP terminal according to an embodiment of the disclosure, and 6B is a diagram illustrating a flow chart of an SPB manager's operation when the SPB manager receives a bundle download request from an SSP terminal according to an embodiment of the disclosure.

In particular, operations 602, 604, and 605 of FIG. 6A illustrate a specific embodiment on an action of operation 421 of FIG. 4A, which is performed by the SPB manager 404.

Referring to FIG. 6A, a bundle/metadata request may be received from an SSP terminal in operation 601. When the bundle/metadata request is received from the SSP terminal, an SPB manager may determine whether the SPB manager holds a bundle requested by the SSP terminal in operation 602. A process of operation 602 of determining whether to hold a bundle may apply values of CODE_M and Challenge_S among pieces of information that the SSP terminal has provided in operation 601. In addition, the SPB manager may determine whether the bundle requested by the SSP terminal is compatible with the SSP terminal in operation 602. Information used for the corresponding determination may apply information of SSP credential which has been provided by the SSP terminal.

Upon passing the determination of operation 602, the SPB manager may send, to the SSP terminal, a response including SPBM key generation information and a bundle encrypted by the bundle/metadata request in accordance with operation 603. The corresponding response may selectively include bundle metadata. Operation 603 may correspond to operation 422a of FIG. 4A.

When the determination of operation 602 is not satisfied, the SPB manager may determine whether the bundle requested by the SSP terminal is a bundle which is switchable to the eSIM profile download in accordance with operation 604. The determination performed by the SPB manager in operation 604 may be constituted by some of the following.

Whether a bundle requested by an SSP terminal matches with a specific eSIM profile
Whether an SPB manager has a function of separately providing a profile (first profile) included in a bundle requested by an SSP terminal
Whether an SPB manager holds activation code information capable of downloading a first profile
Whether an SPB manager has a function of separately providing a profile (second profile) to be provided when bundle installation fails, due to a contract with a service provider who provides a bundle
Whether an SPB manager holds activation code information capable of downloading a second profile Upon passing the determination of operation 604, according to operation 605, the SPB manager may determine whether the SSP terminal has a function of downloading an eSIM profile. The corresponding determination may include an operation of determining effectiveness of an eSIM bundle which has been installed in the SSP terminal, based on terminal information and the SSP credential provided by the SSP terminal.

Upon passing the determination of operation 605, the SPB manager may transmit, to the SSP terminal, an error message and a family identifier-specific error code in operation 606. When a family identifier of the bundle requested by the SSP terminal is a telecom family identifier, the family identifier-specific error code may be a telecom family-specific error code. The contents of the telecom family-specific error code may include the following.

An RSP indicator instructing that the switching to an eSIM profile download procedure is possible
A fully qualified domain name (FQDN) of an SM-DP+ server which is a server for providing an eSIM profile
An AC_Token (MatchingID) capable of indicating an eSIM profile to be downloaded The telecom family-specific error code may selectively include selections defined in GSMA SGP.22, such as an object identifier of SM-DP+.

When the SPB manager fails to pass the determination of operations 604 and 605, the SPB manager may send an error message to the SSP terminal as a response, according to operation 607.

The bundle/metadata request that the SPB manager receives in operation 601 may correspond to the bundle/metadata request performed in operation 420 of FIG. 4A.

In addition, operation 601 of FIG. 6A may correspond to operation of receiving the SPBM certificate request of the SSP terminal in operation 414 of FIG. 4A, and in that case, actions of operations 602, 604, and 605 may be a specific embodiment of the action performed by the SPB manager in operation 415 of FIG. 4A.

Figure 6B:
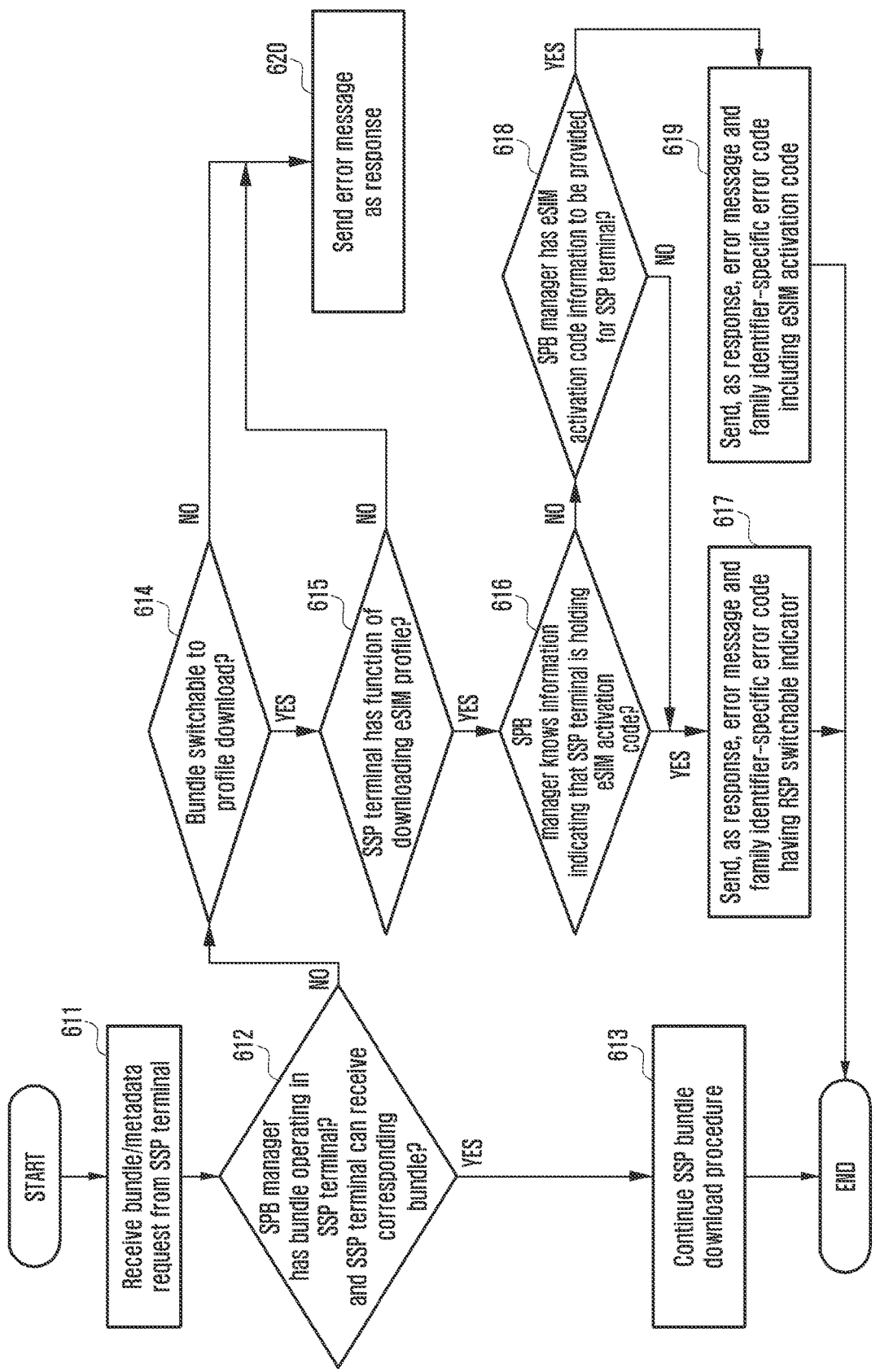
FIG. 6B is a diagram illustrating a flow chart of an SPB manager's operation when the SPB manager receives a bundle download request from an SSP terminal according to an embodiment of the disclosure.

FIG. 6B is a diagram illustrating an action additionally including a process in which an SPB manager determines whether an SSP terminal holds an eSIM activation code, according to an embodiment of the disclosure.

Operations 611, 612, 613, 614, and 615 of FIG. 6B may refer to actions of operations 601, 602, 603, 604, and 605 of FIG. 6A, respectively.

Referring to FIG. 6B, when, in operation 615, the SPB manager determines that the SSP terminal may download an eSIM profile, the SPB manager may determine whether the SSP terminal holds an eSIM activation code in accordance with operation 616. The determination of operation 616 may include a procedure of identifying whether there is information indicating that a terminal is holding an eSIM activation code, among the terminal information and the SSP credential having been received from the SSP terminal in operation 611. When it is determined that the SSP terminal is holding an eSIM activation code, the SPB manager may transmit a family identifier-specific error code including an RSP switchable indicator as a response, in accordance with operation 617.

When it is determined that the SSP terminal does not hold an eSIM activation code in operation 616, it may be determined whether the SPB manager holds an eSIM activation code which may be provided for the SSP terminal, according to operation 618. The determination of operation 618 may include a process of determining whether the SPB manager holds an eSIM activation code with respect to an eSIM profile matching with bundle code matching information (CODE_M) of a bundle generally requested by the SSP terminal. When the SPB manager does not hold an eSIM activation code in operation 618, the SPB manager may transmit a family identifier-specific error code including an RSP switchable indicator as a response, according to operation 617. When the SPB manager holds an eSIM activation code in operation 618, the SPB manager may send a family identifier-specific error code additionally including contents of the held eSIM activation code as a response.

Figure 6C:
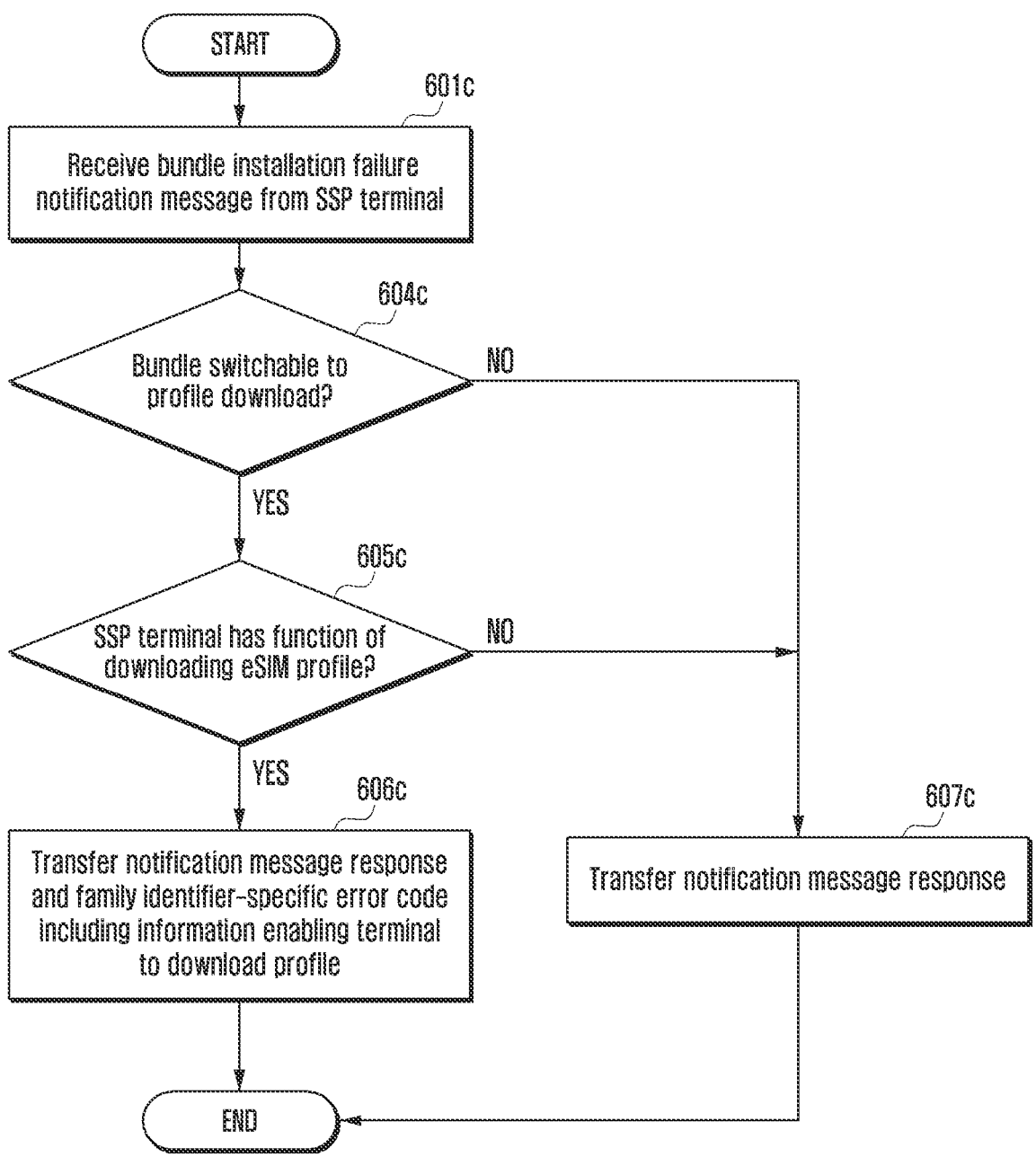
FIG. 6C is a diagram illustrating a flow chart of an SPB manager's operation when a bundle installation failure notification message is received from an SSP terminal according to an embodiment of the disclosure.
Figure 6D:
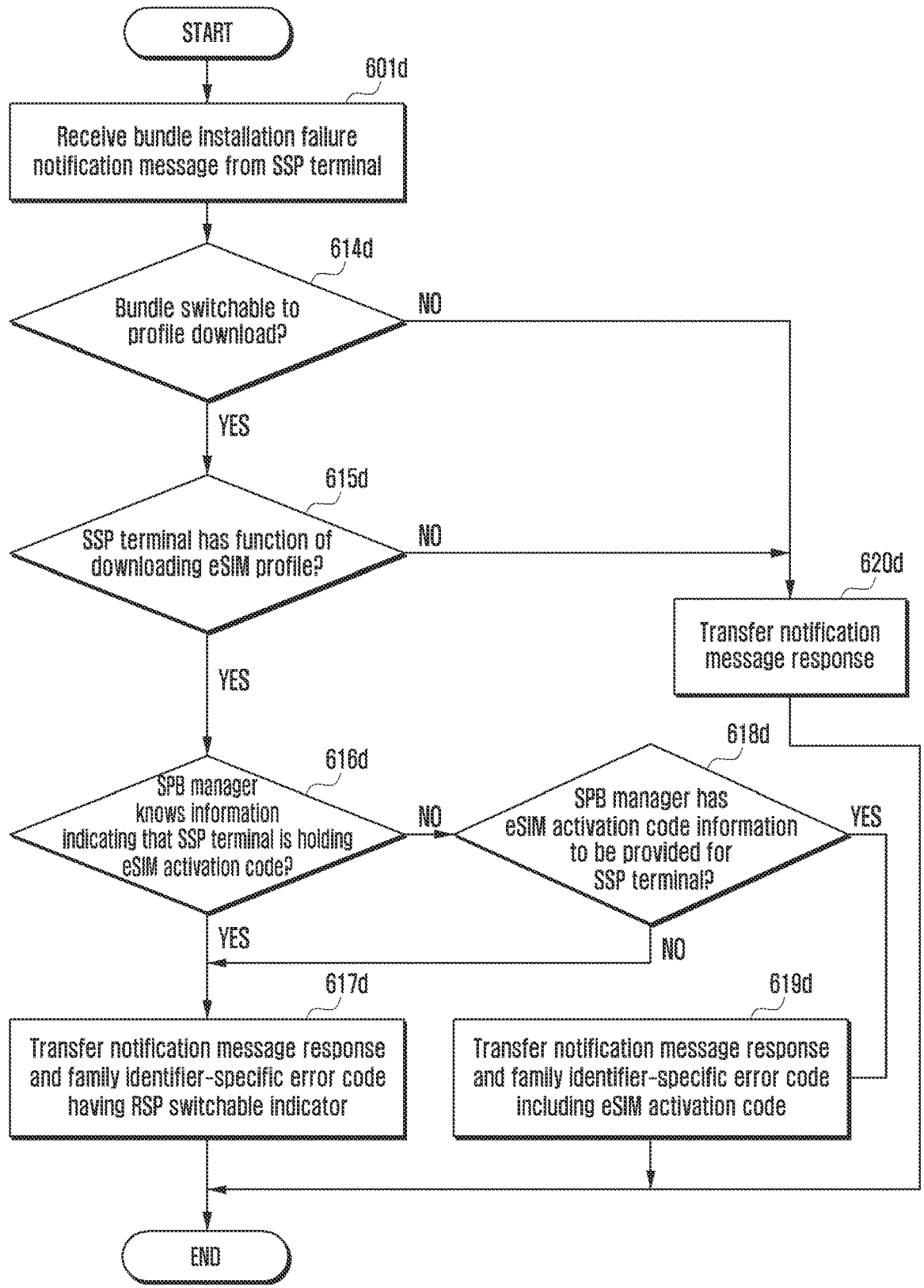
FIG. 6D is a diagram illustrating a flow chart of an SPB manager's operation when a bundle installation failure notification message is received from an SSP terminal according to an embodiment of the disclosure.

FIG. 6C is a diagram illustrating a flow chart of the SPB manager's operation when a bundle installation failure notification message is received from the SSP terminal according to an embodiment of the disclosure, and FIG. 6D is a diagram illustrating a flow chart of the SPB manager's operation when a bundle installation failure notification message is received from the SSP terminal according to an embodiment of the disclosure. FIG. 6C may be an embodiment of an action of processing a notification message performed by the SPB manager in operation 433 of FIG. 4B, and FIG. 6D may be an embodiment of an action of processing a notification message performed by the SPB manager in operation 433 of FIG. 4B.

Operation 601c of FIG. 6C may be one of operations 432a, 432b, or 432c of FIG. 4B.

Operations 604c and 605c of FIG. 6C may be the same as operations 604 and 605 of FIG. 6A.

Referring to FIG. 6C, when the SPB manager determines that the SSP terminal may download an eSIM profile in operation 605c, the SPB manager may transfer, to LBA, a notification message response including a family identifier-specific error code including information that enables a terminal to proceed profile download, in accordance with operation 606c. The family identifier-specific error code of operation 606c may be the same as the family identifier-specific error code described in operation 606 of FIG. 6A.

When in operation 604c, it is not determined that the bundle is switchable to the profile download, or in operation 605c, it is not determined that the SSP terminal has a function of downloading an eSIM profile, the SPB manager may send, to the LBA, a notification message response, in accordance with operation 607c. The notification message response may include an acknowledge message indicating that the notification message has been normally received.

FIG. 6D indicates another embodiment in which, when the SPB manager receives a bundle installation failure notification message from the SSP terminal, the SPB manager handles it.

Operation 601d of FIG. 6D may be one of operations 432a, 432b, or 432c of FIG. 4B.

Operations 614d, 615d, 616d, and 618d of FIG. 6D may refer to operations 614, 615, 616, and 618 of FIG. 6B, respectively.

Referring to FIG. 6D, when in operation 616d, the SPB manager has known information indicating that the SSP terminal is holding an eSIM activation code, or in operation 618d, the SPB manager does not hold eSIM activation code information to be provided for the SSP terminal, the SPB manager may transfer, to the LBA, a notification message response including the family identifier-specific error code having an RSP switchable indicator in accordance with operation 617d. The configuration of the family identifier-specific error code having an RSP switchable indicator may refer to operation 617 of FIG. 6B.

When in operation 618d, the SPB manager is holding eSIM activation code information to be provided for the SSP terminal, according to operation 619d, the SPB manager may transfer, to the LBA, a notification message response including a family identifier-specific error code having an eSIM activation code. The configuration of the notification message response including the family identifier-specific error code having an eSIM activation code may refer to operation 619 of FIG. 6B.

When in operation 614d, it is not determined that the bundle is switchable to the profile download, or in operation 615d, it is not determined that the SSP terminal has a function of downloading an eSIM profile, the SPB manager may send, to the LBA, a notification message response in accordance with operation 620d. The notification message response may include an acknowledge message indicating that the notification message has been normally received.

Figure 7A:
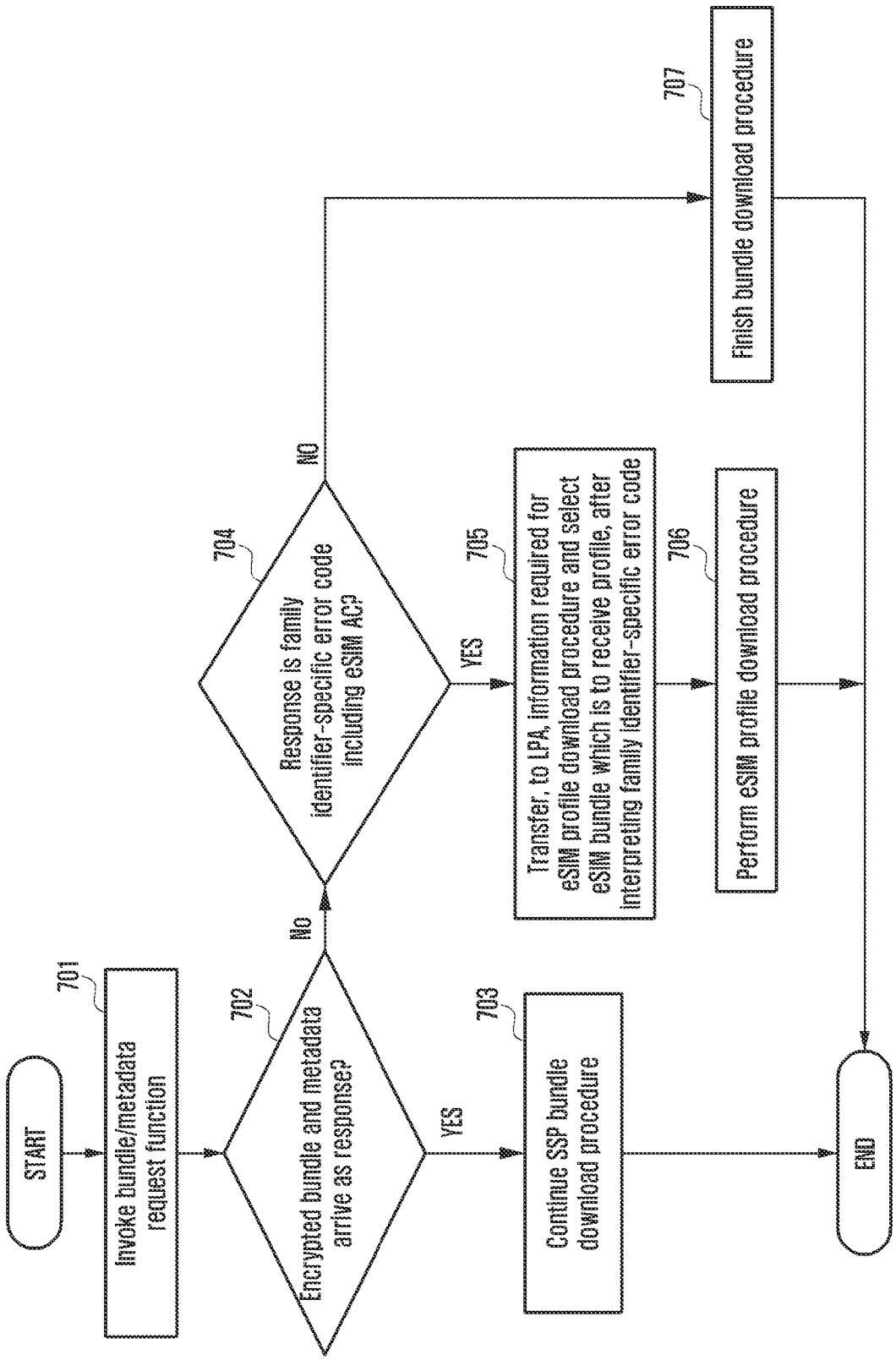
FIG. 7A is a diagram illustrating a flow chart of an operation when LBA of an SSP terminal receives a response to the request that the LBA has sent to an SPB manager during the bundle download procedure according to an embodiment of the disclosure.
Figure 7B:
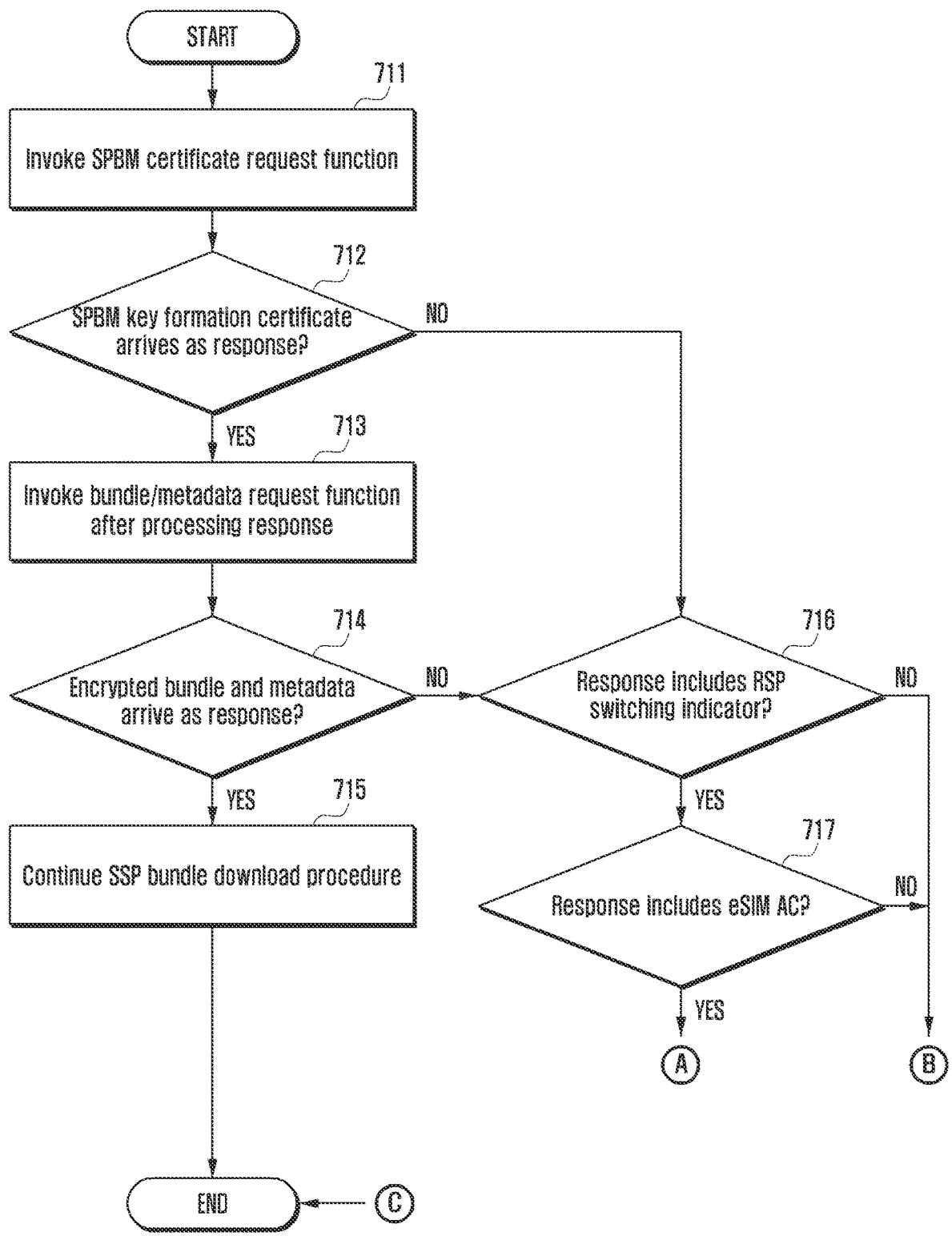
FIGS. 7BA and 7BB are diagrams illustrating a flow chart of an operation when LBA of an SSP terminal receives a response to the request that the LBA has sent to an SPB manager during the bundle download procedure according to various embodiments of the disclosure.
Figure 7B:
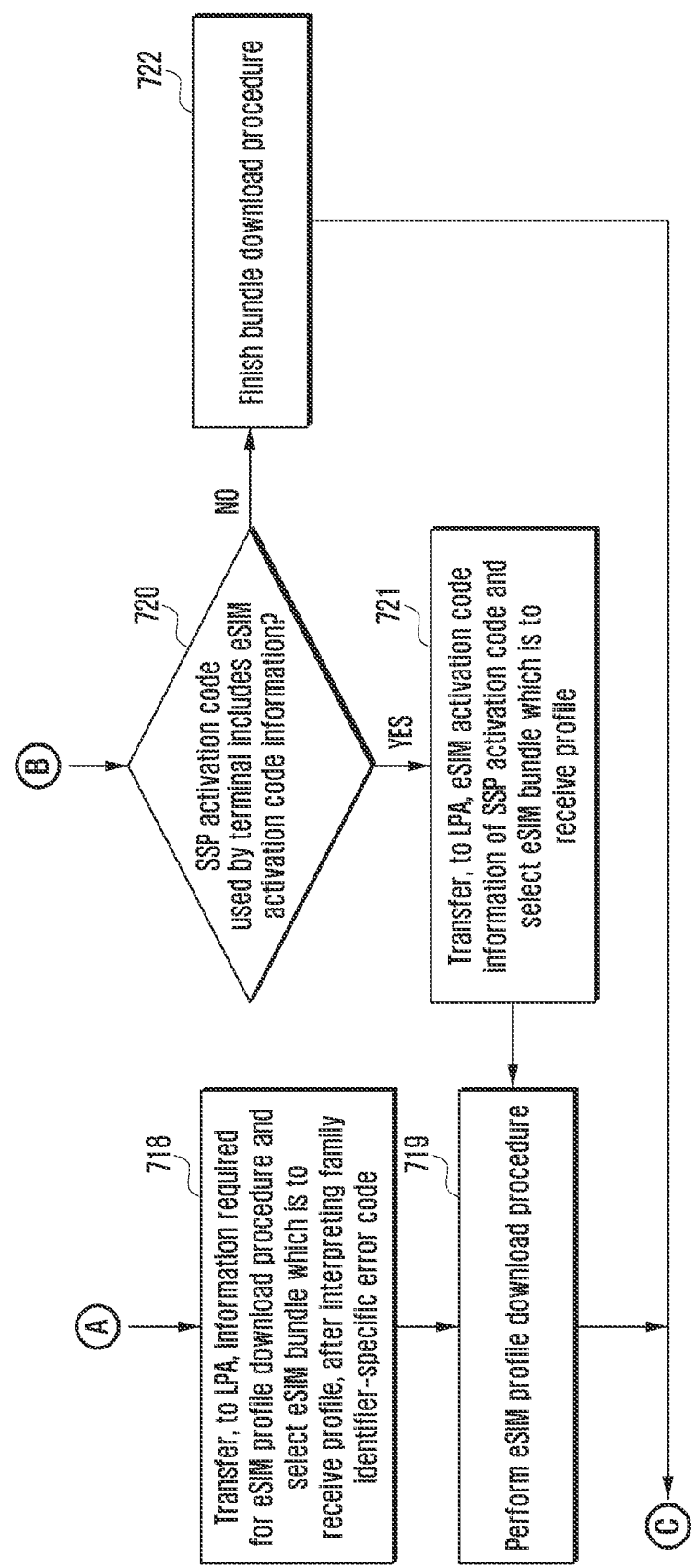
Figure 7C:
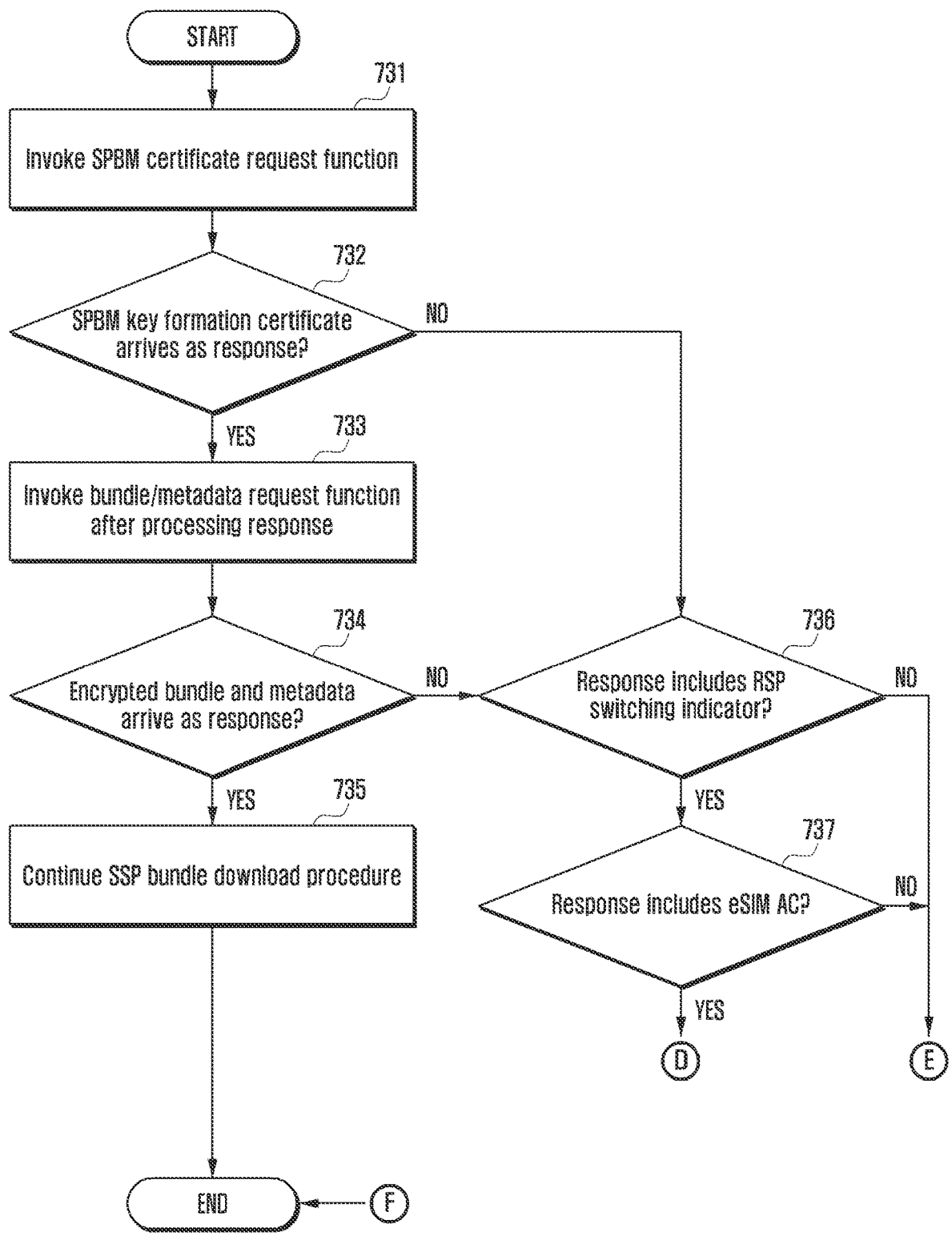
FIGS. 7CA and 7CB are diagrams illustrating a flow chart of an operation when LBA of an SSP terminal receives a response to the request that the LBA has sent to an SPB manager during the bundle download procedure according to various embodiments of the disclosure.
Figure 7C:
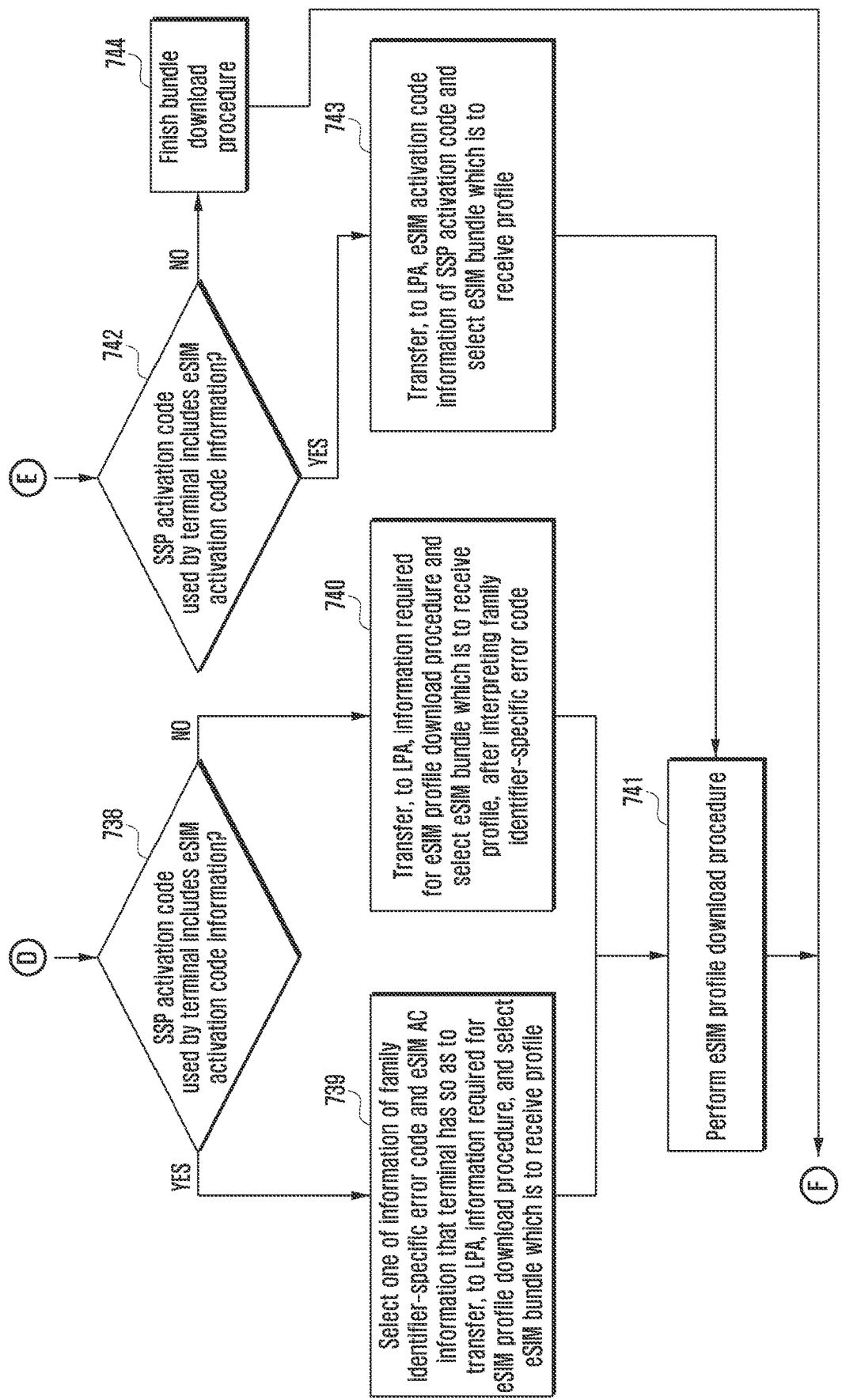

FIG. 7A is a diagram illustrating a flow chart of an operation when LBA of an SSP terminal receives a response to the request that the LBA has sent to an SPB manager during the bundle download procedure according to an embodiment of the disclosure, FIGS. 7BA and 7BB are diagrams illustrating a flow chart of an operation when LBA of an SSP terminal receives a response to the request that the LBA has sent to an SPB manager during the bundle download procedure according to various embodiment of the disclosure, and FIGS. 7CA and 7CB are diagrams illustrating a flow chart of an operation when LBA of an SSP terminal receives a response to the request that the LBA has sent to an SPB manager during the bundle download procedure according to various embodiments of the disclosure.

In particular, operation 702 of FIG. 7A illustrates an example of an action when LBA sends the bundle/metadata request having been performed in operation 420 of FIG. 4A, and receives, from an SPB manager, a response to the bundle/metadata request.

Referring to FIG. 7A, after operations 411 to 419 of FIG. 4A are performed, the flow chart of FIG. 7A starts, and LBA may thus invoke a bundle/metadata request function in operation 701. The LBA may receive, from an SPB manager having received a bundle/metadata request, a response including at least one of an encrypted bundle and bundle metadata in operation 702. When the LBA receives, from the SPB manager having received a bundle/metadata request, a response including at least one of an encrypted bundle and bundle metadata, the LBA may continue to perform the bundle download procedure in operation 703. Operation 703 may include the following operations.

LBA identifies bundle metadata information.
When LBA identifies that bundle metadata information is normal, an encrypted bundle and bundle metadata are transmitted to an SPB loader to install a bundle in an SSP.

When in operation 702, the LBA does not receive a response to the bundle/metadata request, the response including at least one of an encrypted bundle and bundle metadata, it may be identified whether the response is a family identifier-specific error code including contents of an eSIM activation code in operation 704. The family identifier-specific error code may refer to the description described in the family identifier-specific error code 320 of FIG. 3. When the LBA receives, as a response, an error message having no family identifier-specific error code, or unknown information, the LBA may finish the bundle download procedure in operation 707.

When the response is a family identifier-specific error code including contents of an eSIM activation code, the LBA may perform the following actions in operation 705. In particular, the following actions describe an embodiment of a case in which a family identifier of a bundle is a telecom family identifier.

Interpret contents of a family identifier-specific error code and extract contents of an eSIM activation code Transfer, to LPA, information (contents of an eSIM activation code) required for an eSIM profile download procedure Select an eSIM bundle which is to download an eSIM profile, select and activate one of installed eSIM bundles when there is no enabled eSIM bundle After operation 705 is performed, the LBA and LPA may perform an eSIM profile download procedure defined in GSMA SGP.22 by using the selected eSIM bundle in operation 706.

According to an embodiment, operation 701 of FIG. 7A may be operation 414 of FIG. 4A. In that case, the determination of operation 702 may be replaced by a process of determining whether the response of the SPB manager corresponds to the response that the SPB manager sends to the LBA in operation 416a of FIG. 4A. When the SPB manager's response to the SPBM certificate request function sent by the LBA according to operation 414 does not correspond to the response sent by the SPB manager in operation 416a, the action of the LBA may be performed according to the flow chart after operation 704. When the LBA receives the response that the SPB manager has sent in operation 416a as the SPB manager's response to the SPBM certificate request, the LBA performs the next action in operation 417 according to the bundle download procedure.

According to an embodiment, FIGS. 7BA and 7BB are diagrams illustrating a procedure of: when the SPB manager's response includes an eSIM activation code, performing the switching to eSIM profile download by using the corresponding information; and when the SPB manager's response does not include an eSIM activation code, performing the switching to an eSIM profile download procedure by using an eSIM activation code that a terminal is holding.

The beginning of FIG. 7BA and FIG. 7BB is the time before the SSP terminal performs operation 414 of FIG. 4A. Operation 711 refers to operation 414 of FIG. 4A. When in operation 712, the response according to operation 416a is received from the SPB manager, operation 713 is performed. When in operation 712, the response according to operation 416b is received from the SPB manager, operation 716 is performed.

Operations 713, 714, and 715 may refer to the description of operations 701, 702, and 703 of FIG. 7A.

In operation 716, the LBA may determine whether the SPB manager's response is a family identifier-specific error code including an RSP switching indicator.

When the SPB manager's response is a family identifier-specific error code including an RSP switching indicator, according to operation 717, the LBA may determine whether the response includes contents of an eSIM activation code. When the response is a family identifier-specific error code including an eSIM activation code, the LBA operates according to operation 718. Operation 718 may refer to operation 705 of FIG. 7A.

When in operation 716, the response is not a family identifier-specific error code including an RSP switching indicator, and in operation 717, the response does not include an eSIM activation code, operation 720 may be performed.

Operation 720 may determine whether the SSP activation code information, which has been applied when the LBA performs the bundle download procedure at the beginning in accordance with operation 301 of FIG. 3, includes an eSIM activation code. When a bundle is downloaded, the determination of operation 720 may be a process of determining whether there is information which enables the LBA to download an eSIM profile corresponding to a bundle to be downloaded.

When in operation 720, the LBA is holding an eSIM activation code, according to operation 721, the LBA transfers, to the LPA, the eSIM activation code that the LBA is holding and may then select an eSIM bundle which is to receive a profile.

Operations 719 and 722 may refer to operations 706 and 707 of FIG. 7A, respectively.

According to an embodiment, FIG. 7CA and FIG. 7CB is a diagram illustrating a procedure in which, when the SPB manager's response includes an eSIM activation code, the LBA additionally determines whether there is an eSIM activation code that the SSP terminal has held, and when the SSP terminal holds an eSIM activation code, the LBA selects one of two pieces of information and tries to perform eSIM profile download.

Actions of operations 731, 732, 733, 734, and 735 of FIG. 7CA and FIG. 7CB may correspond to actions of operations 711, 712, 713, 714, and 715 of FIG. 7BA and FIG. 7BB, respectively.

Actions of operations 736, 737, 742, and 743 of FIG. 7CA and FIG. 7CB may correspond to operations 716, 717, 720, and 721 of FIG. 7BA and FIG. 7BB, respectively.

When according to operation 737, the LBA receives, as a response, a family identifier-specific error code including contents of an eSIM activation code, according to operation 738, the LBA may determine whether the SSP activation code information includes an eSIM activation code, the SSP activation code information having been applied to the bundle download request. Operation 738 may refer to operation 720 of FIG. 7BA and FIG. 7BB.

When the LBA is holding an eSIM activation code in operation 738, the LBA may select one of the eSIM activation code that the LBA has held according to operation 739, and the eSIM activation code included in the family identifier-specific error code received from the SPB manager so as to transfer the selected code to the LPA and may select the eSIM bundle having received a profile. In operation 739, the eSIM activation code that the LBA has held, and the eSIM activation code included in the family identifier-specific error code having received from the SPB manager may be the same information.

When in operation 738, there is no eSIM activation code that the LBA has held, operation 740 may be performed. The action of operation 740 may refer to operation 718 of FIG. 7BA and FIG. 7BB.

Operations 741 and 744 may refer to operations 706 and 707 of FIG. 7A, respectively.

Figure 8A:
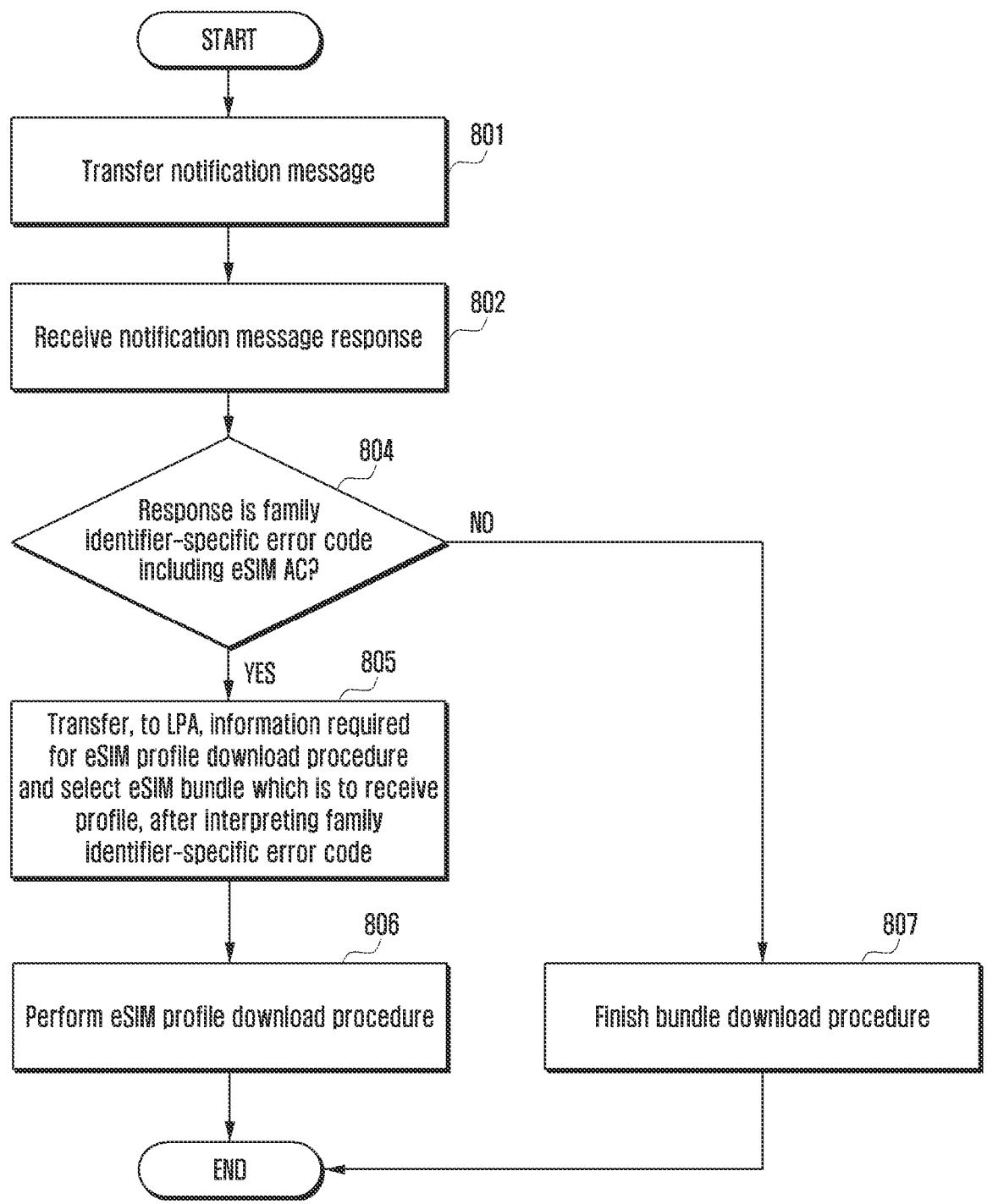
FIG. 8A is a diagram illustrating a flow chart of an operation when LBA of an SSP terminal receives a response to the notification message that the LBA has sent to an SPB manager during the bundle download procedure according to an embodiment of the disclosure.
Figure 8B:
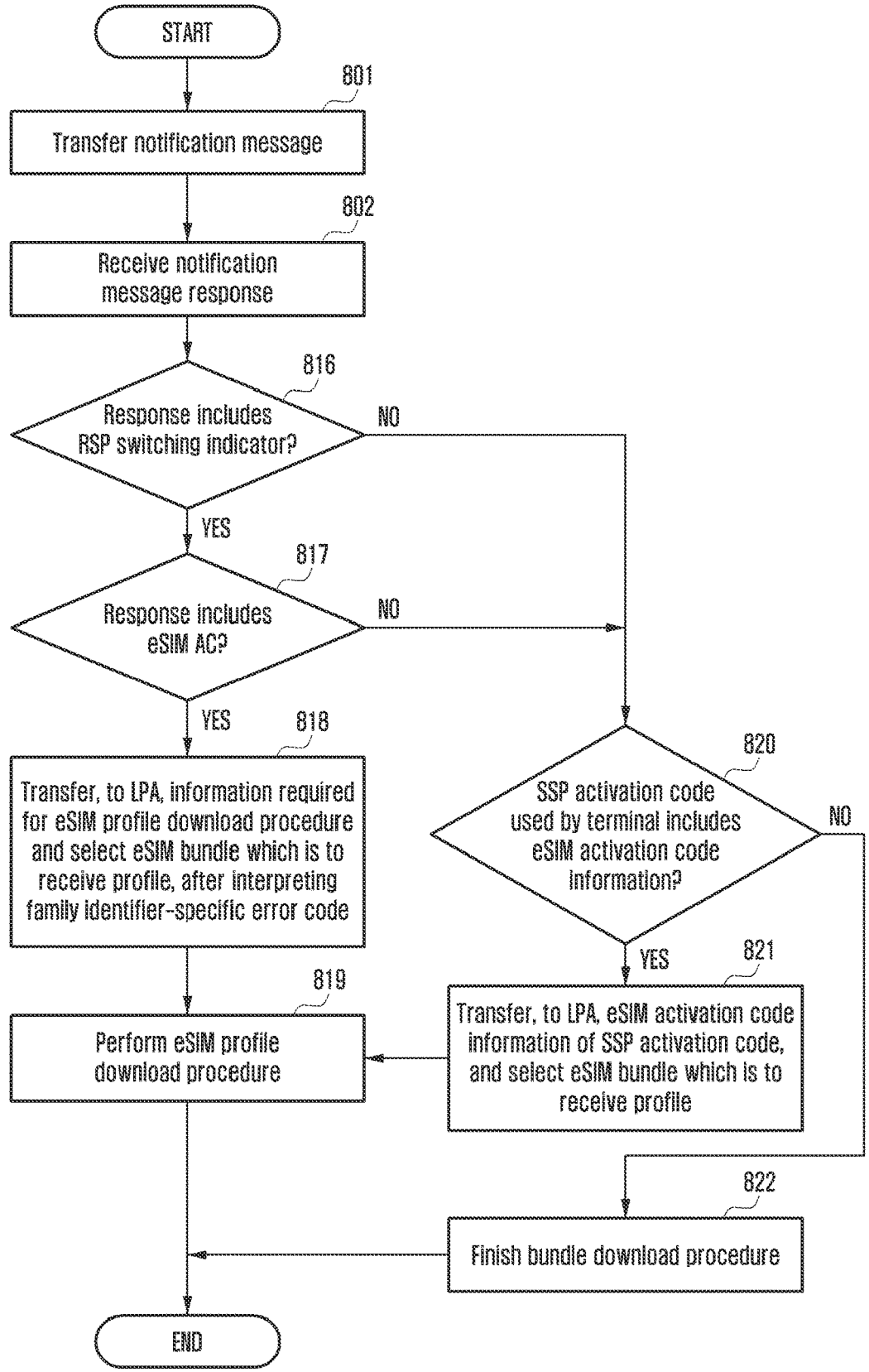
FIG. 8B is a diagram illustrating a flow chart of an operation when LBA of an SSP terminal receives a response to the notification message that the LBA has sent to an SPB manager during the bundle download procedure according to an embodiment of the disclosure.
Figure 8C:
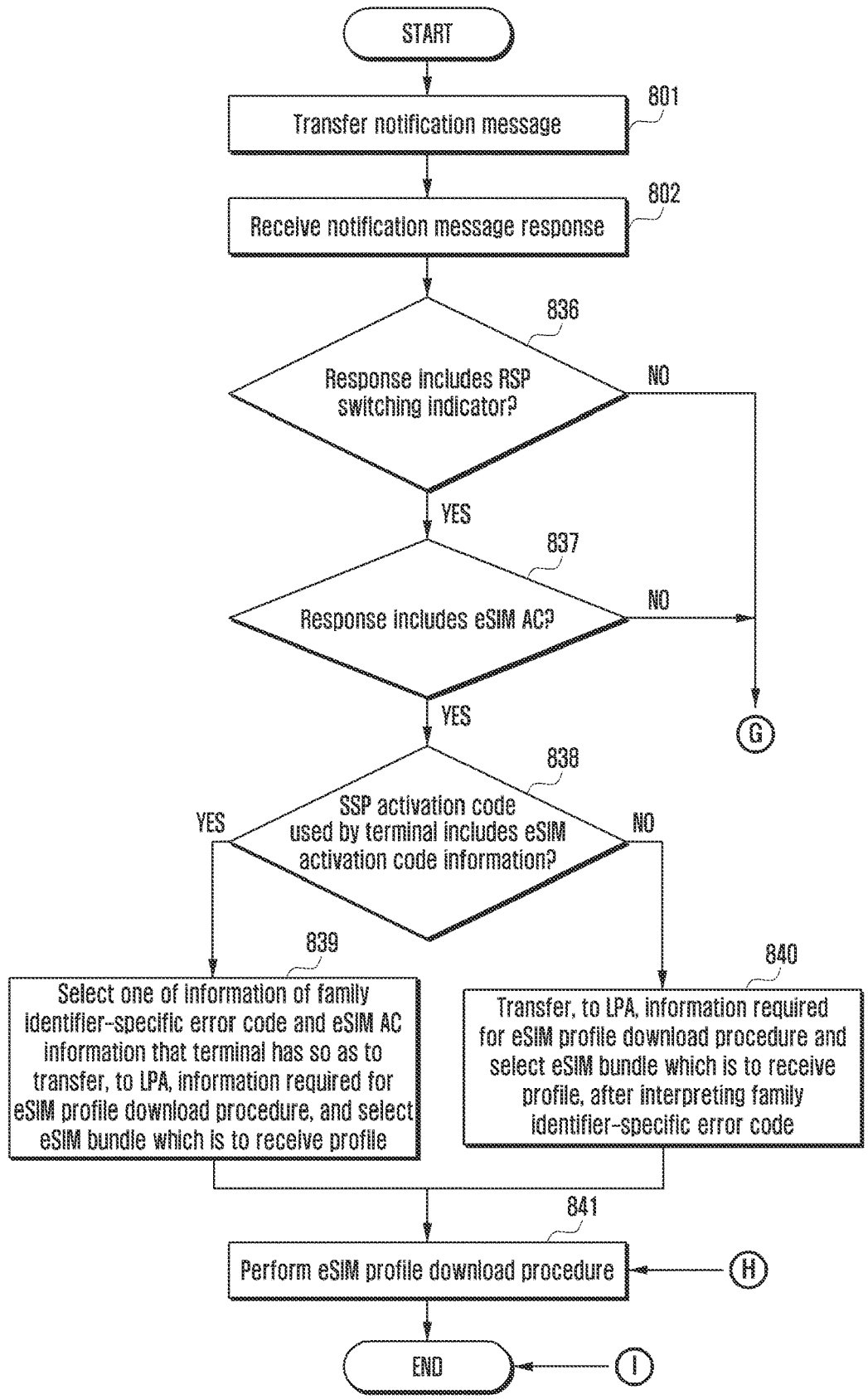
FIGS. 8CA and 8CB are diagrams illustrating a flow chart of an operation when LBA of an SSP terminal receives a response to the notification message that the LBA has sent to an SPB manager during the bundle download procedure according to various embodiments of the disclosure.
Figure 8C:
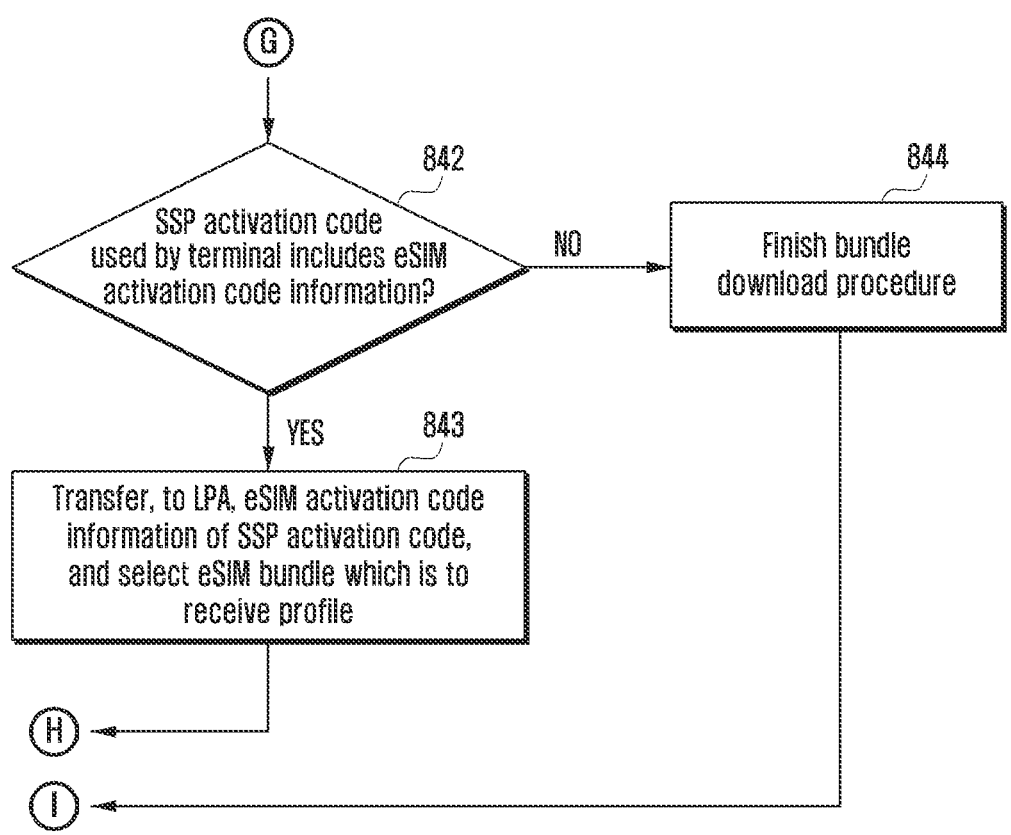

FIG. 8A is a diagram illustrating a flow chart of an operation when LBA of an SSP terminal receives a response to the notification message that the LBA has sent to an SPB manager during the bundle download procedure according to an embodiment of the disclosure, FIG. 8B is a diagram illustrating a flow chart of an operation when LBA of an SSP terminal receives a response to the notification message that the LBA has sent to an SPB manager during the bundle download procedure according to an embodiment of the disclosure, and FIGS. 8CA and 8CB are diagrams illustrating a flow chart of an operation when LBA of an SSP terminal receives a response to the notification message that the LBA has sent to an SPB manager during the bundle download procedure according to various embodiments of the disclosure.

Operation 801 of FIGS. 8A to 8CA and FIG. 8CB may be one of operations 432a, 432b, and 432c of FIG. 4B.

Operation 802 of FIGS. 8A to 8CA and FIG. 8CB may be operation 434 of FIG. 4B.

Operations 804, 805, 806, and 807 of FIG. 8A may refer to operations 704, 705, 706, and 707 of FIG. 7A, respectively.

Operations 816, 817, 818, 819, 820, 821, and 822 of FIG. 8B may refer to operations 716, 717, 718, 719, 720, 721, and 722 of FIG. 7BA and FIG. 7BB, respectively.

Operations 836, 837, 838, 839, 840, 841, 842, 843, and 844 of FIG. 8CA and FIG. 8CB may refer to operations 736, 737, 738, 739, 740, 741, 742, 743, and 744 of FIG. 7CA and FIG. 7CB, respectively.

Figure 9:
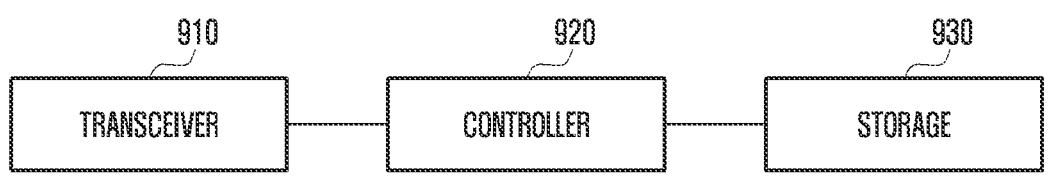
FIG. 9 is a diagram illustrating a structure of a terminal according to an embodiment of the disclosure.

FIG. 9 is a diagram illustrating a structure of a terminal according to an embodiment of the disclosure.

Referring to FIG. 9, a terminal may include a transceiver 910, a controller 920, and a storage unit 930. In the disclosure, the controller may be defined as a circuit, an application-specific integrated circuit, or at least one processor.

The transceiver 910 may transmit/receive a signal to/from other network entity. For example, the transceiver 910 may receive system information from a base station, and may receive a synchronization signal or a reference signal.

The controller 920 may control the entire operation of the terminal according to an embodiment suggested in the disclosure.

The storage unit 930 may store at least one of information transmitted/received via the transceiver 910 and information generated by the controller 920.

Figure 10:
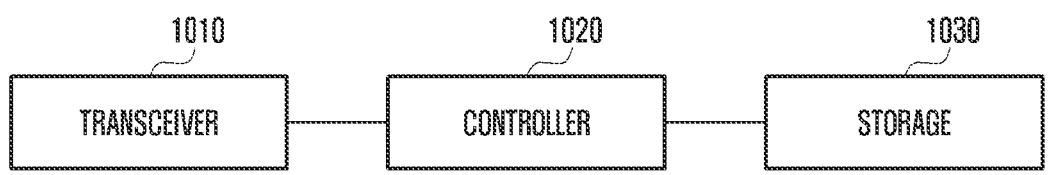
FIG. 10 is a diagram illustrating a structure of a server according to an embodiment of the disclosure.

FIG. 10 is a diagram illustrating a structure of a server according to an embodiment of the disclosure.

Referring to FIG. 10, a server may include a transceiver 1010, a controller 1020, and a storage unit 1030. In the disclosure, the controller may be defined as a circuit, an application-specific integrated circuit, or at least one processor.

The transceiver 1010 may transmit/receive a signal to/from other network entity. For example, the transceiver 1010 may transmit system information to a terminal, and may transmit a synchronization signal or a reference signal.

The controller 1020 may control the entire operation of the server according to an embodiment suggested in the disclosure.

The storage unit 1030 may store at least one of information transmitted/received via the transceiver 1010 and information generated by the controller 1020.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, modifications and changes can be made thereto without departing from the scope of the disclosure. Therefore, the scope of the disclosure should not be defined as being limited to the described embodiments, but should be defined by the appended claims and equivalents thereof.

It should be appreciated that various embodiments of the disclosure and the terms used therein are not intended to limit the technological features set forth herein to particular embodiments and include various changes, equivalents, and/or alternatives for a corresponding embodiment. With regard to the description of the drawings, similar reference numerals may be used to designate similar or relevant elements. It is to be understood that a singular form of a noun corresponding to an item may include one or more of the things, unless the relevant context clearly indicates otherwise. In the disclosure, each of such phrases as "A or B", "at least one of A and/or B", "A, B, or C", and "at least one of A, B, and/or C" may include all possible combinations of the items enumerated together in a corresponding one of the phrases. As used herein, such terms as "a first", "a second", "the first", and "the second" may modify corresponding elements regardless of order or importance, may be used to simply distinguish the corresponding elements from others, and does not limit the elements. It is to be understood that if an element (e.g., first element) is referred to as "(functionally or communicatively) connected to" or "access" other element (e.g., second element), it means that the element may be connected to the other element directly or via another element (e.g., third element).

As used in the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, the module may be implemented in a form of an application-specific integrated circuit (ASIC).

Various embodiments of the disclosure may be implemented as software (e.g., program) including one or more instructions that are stored in a machine-readable storage media (e.g., internal memory or external memory) that is readable by a machine (e.g., computer). For example, a machine is a device which can invoke at least one of the one or more stored instructions from the storage media and execute according to the invoked instructions, and may include terminals according to various embodiments. When the command is executed by a processor, the processor may perform a function corresponding to the command with or without using one or more other elements under the control of the processor. The command may include a code generated or executed by a compiler or an interpreter.

The machine-readable storage medium may be provided in the form of a non-transitory storage medium. Wherein, the term "non-transitory" simply means that the storage medium is a tangible device, and does not include a signal, but this term does not differentiate between where data is semi-permanently stored in the storage medium and where the data is temporarily stored in the storage medium.

Methods according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed online via an application store (e.g., Play Store™) If distributed online, at least part of the computer program product may be temporarily generated or at least temporarily stored in the storage medium such as a memory of the manufacturer's server, a server of the application store, or a relay server. According to various embodiments, each element (e.g., a module or a program) may include a single entity or multiple entities, and one or more of the above-described sub-elements may be omitted, or may be added to various embodiments. Alternatively or additionally, a plurality of elements (e.g., modules or programs) may be integrated into a single element. In such a case, the integrated element may perform one or more functions of each of the plurality of elements in the same or similar manner as they are performed by a corresponding one of the plurality of elements before the integration. According to various embodiments, operations performed by the module, the program, or another element may be carried out sequentially, in parallel, repeatedly, or heuristically, or one or more of the operations may be executed in a different order or omitted, or one or more other operations may be added.

While the disclosure has been shown described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a server in a wireless communication system, the method comprising:

receiving, from a terminal, a first message requesting a download of a bundle, wherein the first message includes at least one of smart secure platform (SSP) information or terminal information;

determining whether the bundle can be installed in a smart secure platform (SSP) included in the terminal based on the at least one of smart secure platform (SSP) information or terminal information;

determining whether to switch from the download of the bundle to a download of an embedded subscriber identity module (eSIM) profile in an eSIM bundle included in the SSP based on the at least one of smart secure platform (SSP) information or terminal information, if the bundle cannot be installed in the SSP included in the terminal; and transmitting, to the terminal, a second message including a family identifier-specific error code if the switching from the download of the bundle to the download of the eSIM profile in the eSIM bundle included in the SSP is determined, wherein the second message further includes an indicator indicating that switching to the download of the eSIM profile is possible, wherein the SSP information includes primary platform information.

2. The method of claim 1, wherein the family identifier-specific error code includes information on a profile download.

3. The method of claim 1, wherein the eSIM bundle among eSIM bundles installed in the SSP is selected based on the family identifier-specific error code.

4. The method of claim 1,
wherein the SSP information further includes at least one of a secondary platform bundle (SPB) loader information, a list of eSIM bundles installed in the SSP, and
wherein the terminal information includes information on whether the eSIM profile can be installed.

5. A method performed by a terminal in a wireless communication system, the method comprising:
transmitting, to a server, a first message requesting a download of a bundle, wherein the first message includes at least one of smart secure platform (SSP) information or terminal information; and
receiving, from the server, a second message including a family identifier-specific error code if the bundle cannot be installed in a smart secure platform (SSP) included in the terminal and if switching from the download of the bundle to a download of an embedded subscriber identity module (eSIM) profile in an eSIM bundle included in the SSP is determined based on the at least one of smart secure platform (SSP) information or terminal information, wherein the eSIM profile is transmitted to the terminal and the second message further includes an indicator indicating that switching to the download of the eSIM profile is possible; and
downloading, from the server, the eSIM profile in the eSIM bundle,
wherein whether the bundle can be installed in the SSP included in the terminal is determined based on the at least one of smart secure platform (SSP) information or terminal information, and
wherein the SSP information includes primary platform information.

6. The method of claim 5, wherein the family identifier-specific error code includes information on a profile download.

7. The method of claim 5, further comprising:
selecting the eSIM bundle among eSIM bundles installed in the SSP based on the family identifier-specific error code.

8. The method of claim 5,
wherein the SSP information further includes at least one of a secondary platform bundle (SPB) loader information, a list of eSIM bundles installed in the SSP, and
wherein the terminal information includes information on whether the eSIM profile can be installed.

9. A server comprising:
a transceiver configured to transmit or receive at least one signal; and
at least one processor operatively coupled to the transceiver,
wherein the at least one processor is configured to:
receive, from a terminal, a first message requesting a download of a bundle, wherein the first message includes at least one of smart secure platform (SSP) information or terminal information,
determine whether the bundle can be installed in a smart secure platform (SSP) included in the terminal based on the at least one of smart secure platform (SSP) information or terminal information,
determine whether to switch from the download of the bundle to a download of an embedded subscriber identity module (eSIM) profile in an eSIM bundle included in the SSP based on the at least one of smart secure platform (SSP) information or terminal information, if the bundle cannot be installed in the SSP included in the terminal, and
transmit, to the terminal, a second message including a family identifier-specific error code if the switching from the download of the bundle to the download of the eSIM profile in the eSIM bundle included in the SSP is determined, wherein the second message further includes an indicator indicating that switching to the download of the eSIM profile is possible,
wherein the SSP information includes primary platform information.

10. The server of claim 9, wherein the family identifier-specific error code includes information on a profile download.

11. The server of claim 9, wherein the eSIM bundle among eSIM bundles installed in the SSP is selected based on the family identifier-specific error code.

12. The server of claim 9,
wherein the SSP information further includes at least one of a secondary platform bundle (SPB) loader information, a list of eSIM bundles installed in the SSP, and
wherein the terminal information includes information on whether the eSIM profile can be installed.

13. A terminal comprising:
a transceiver configured to transmit or receive at least one signal; and
at least one processor operatively coupled to the transceiver,
wherein the at least one processor is configured to:
transmit, to a server, a first message requesting a download of a bundle, wherein the first message includes at least one of smart secure platform (SSP) information or terminal information,
receive, from the server, a second message including a family identifier-specific error code if the bundle cannot be installed in a smart secure platform (SSP) installed in the terminal, and if switching from the download of the bundle to a download of an embedded subscriber identity module (eSIM) profile in an eSIM bundle included in the SSP is determined based on the at least one of smart secure platform (SSP) information or terminal information, wherein the eSIM profile is transmitted to the terminal and the second message further includes an indicator indicating that switching to the download of the eSIM profile is possible, and
download, from the server, the eSIM profile in the eSIM bundle, wherein whether the bundle can be installed in the SSP included in the terminal is determined based on the at least one of smart secure platform (SSP) information or terminal information, and wherein the SSP information includes primary platform information.

14. The terminal of claim 13, wherein the family identifier-specific error code includes information on a profile download.

15. The terminal of claim 13, wherein the at least one processor is further configured to select the eSIM bundle among eSIM bundles installed in the SSP based on the family identifier-specific error code.

16. The terminal of claim 13, wherein the SSP information further includes at least one of a secondary platform bundle (SPB) loader information, a list of eSIM bundles installed in the SSP, and wherein the terminal information includes information on whether the eSIM profile can be installed.

* * * * *